(12) United States Patent
Fradette et al.

(10) Patent No.: US 12,544,715 B2
(45) Date of Patent: Feb. 10, 2026

(54) BIOCATALYST-BASED $CO_2$ STRIPPING TECHNIQUES AND RELATED SYSTEMS

(71) Applicant: SAIPEM S.P.A., San Donato Milanese (IT)

(72) Inventors: Sylvie Fradette, San Donato Milanese (IT); Richard Surprenant, San Donato Milanese (IT); Eric Madore, San Donato Milanese (IT); Hana Bouteldja, San Donato Milanese (IT); Sylvain Lefebvre, San Donato Milanese (IT); Ferrere J. Clerveaux, San Donato Milanese (IT)

(73) Assignee: SAIPEM S.P.A., San Donato Milanese (IT)

( * ) Notice: Subject to any disclaimer, the term of this patent is extended or adjusted under 35 U.S.C. 154(b) by 943 days.

(21) Appl. No.: 17/434,227

(22) PCT Filed: Feb. 27, 2020

(86) PCT No.: PCT/IB2020/051682
§ 371 (c)(1),
(2) Date: Aug. 26, 2021

(87) PCT Pub. No.: WO2020/174435
PCT Pub. Date: Sep. 3, 2020

(65) Prior Publication Data
US 2022/0118403 A1    Apr. 21, 2022

Related U.S. Application Data

(60) Provisional application No. 62/811,949, filed on Feb. 28, 2019.

(51) Int. Cl.
*B01D 53/75*    (2006.01)
*B01D 53/14*    (2006.01)
(Continued)

(52) U.S. Cl.
CPC ......... *B01D 53/75* (2013.01); *B01D 53/1425* (2013.01); *B01D 53/1475* (2013.01);
(Continued)

(58) Field of Classification Search
CPC .. B01D 3/38; B01D 53/1418; B01D 53/1425; B01D 53/1475; B01D 53/1493;
(Continued)

(56) References Cited

U.S. PATENT DOCUMENTS

2013/0118350 A1* 5/2013 Rolker ............... B01D 53/1493
96/234
2014/0017622 A1* 1/2014 Chen .................. B01D 19/0005
432/29
(Continued)

FOREIGN PATENT DOCUMENTS

DE    102016212566 A1    1/2018
WO    2004080573 A1    9/2004
(Continued)

OTHER PUBLICATIONS

International Search Report and Written Opinion for International Patent Application No. PCT/IB2020/051682, mailed Oct. 6, 2020, 16 Pages.

*Primary Examiner* — Jennifer Dieterle
*Assistant Examiner* — Phillip Y Shao
(74) *Attorney, Agent, or Firm* — Armstrong Teasdale LLP

(57) ABSTRACT

A method for stripping $CO_2$ from a biocatalyst-containing $CO_2$-rich absorption solution to produce a biocatalyst-containing $CO_2$-lean absorption solution and a $CO_2$-rich gas is provided. The method includes generating a stripping gas from a portion of the biocatalyst-containing $CO_2$-lean absorption solution in a stripping gas generation unit, and contacting the biocatalyst-containing $CO_2$-rich absorption solution with the stripping gas in a gas-liquid contactor to
(Continued)

produce the $CO_2$-lean absorption solution and the $CO_2$-rich gas.

15 Claims, 17 Drawing Sheets

(51) Int. Cl.
  *B01D 53/18*   (2006.01)
  *B01D 53/78*   (2006.01)
(52) U.S. Cl.
  CPC ............. *B01D 53/18* (2013.01); *B01D 53/78* (2013.01); *B01D 2251/606* (2013.01); *B01D 2252/602* (2013.01); *B01D 2255/804* (2013.01)
(58) Field of Classification Search
  CPC ........ B01D 53/18; B01D 53/75; B01D 53/78; B01D 2251/606; B01D 2252/10; B01D 2252/602; B01D 2255/804; B01D 2258/0283; C01B 32/50; C10K 1/005; C10K 1/10; C10K 1/12; Y02A 50/20; Y02C 20/40; Y02P 20/151; Y02P 70/10
  See application file for complete search history.

(56) References Cited

U.S. PATENT DOCUMENTS

2015/0231561 A1  8/2015 Reardon et al.
2017/0239589 A1* 8/2017 Spriewald .............. B01D 3/141

FOREIGN PATENT DOCUMENTS

| WO | 2011014956 A1 | 2/2011 |
| WO | 2012055035 A1 | 5/2012 |
| WO | 2016057918 A1 | 4/2016 |
| WO | 2016090357 A1 | 6/2016 |

* cited by examiner

BIOCATALYST-BASED $CO_2$ STRIPPING TECHNIQUES AND RELATED SYSTEMS

CROSS-REFERENCE TO RELATED APPLICATIONS

This application is a National Phase Application of PCT International Application No. PCT/IB2020/051682, having an International Filing Date of Feb. 27, 2020, which claims priority to U.S. provisional Application No. 62/811,949 filed Feb. 28, 2019, each of which is hereby incorporated by reference in its entirety.

TECHNICAL FIELD

The present invention generally relates to biocatalyst-based $CO_2$ capture processes, and more particularly to $CO_2$ stripping techniques using a gas-liquid contactor.

BACKGROUND

Some known $CO_2$ capture processes are based on the use of the enzyme carbonic anhydrase to increase the $CO_2$ capture performance of absorption solutions. These processes are composed of two main units: an absorption unit to capture the $CO_2$ from a $CO_2$-containing gas and a stripping unit where the absorbed $CO_2$ is released from the $CO_2$ rich-absorption solution and consequently the absorption solution is regenerated.

A simplified $CO_2$-capture process configuration is shown in FIG. 1. The process comprises two zones: the absorption zone operating at low temperature and the stripping zone operating at a higher temperature. In such a process, a $CO_2$ containing gas (1) is fed to the absorption unit (2) where it flows upward while contacting an aqueous absorption solution (4). As the gas contacts the absorption solution, the $CO_2$ is absorbed by the solution. The treated gas (3) then leaves the absorption unit and is released to the atmosphere or sent to other units for further treatments or use. The absorption solution containing the absorbed $CO_2$ (5) is then pumped (pump 6) through two heat exchangers (7, 8) where its temperature is increased and then fed to a stripping unit (9) where the conditions are adjusted such that the $CO_2$ is released from the solution and the solution is regenerated. Heat exchanger (8) is often optional. The gas (19) leaving the stripping unit (9) is fed to a condenser (14) where the steam is condensed. The gas-liquid stream (20d) in then sent to a separator (14a) where the high $CO_2$ concentration gas (20b) exits the separator (14a) and is sent (compressor/vacuum pump 36) for its use or further treatment (stream 20). The condensed steam (20a) is returned to the process. Part of the $CO_2$-lean absorption solution leaving the stripping unit (10) is sent back to the absorption unit using pump (16), the other part of the $CO_2$-lean absorption solution (11) is pumped via pump (17) to a reboiler (12). The solution is then boiled to produce steam, the produced steam/liquid mixture (13) is sent to the stripping unit (9). The steam moves upward and acts as a stripping gas to favor $CO_2$ desorption from the solution. Prior to being fed to the absorber, solution (15) is cooled through heat exchangers (7, 18).

When used in combination with the above-mentioned techniques, the absorption solution is usually an alkaline solution characterized by a pH higher than 9, the absorption unit operates at temperatures ranging from 10-50° C., the $CO_2$-rich absorption solution is heated up to temperature ranging from 50 to 90° C. prior to being fed to the stripping unit which may be operated under vacuum conditions or pressure conditions close to the atmospheric pressure. Consequently, the enzyme used in such $CO_2$ capture processes is exposed to alkaline pHs higher than 9 and temperatures ranging from 10-90° C., high pH and high temperature conditions are known to be detrimental to enzymes.

Most references reporting enzyme-based (carbonic anhydrase-based) $CO_2$ capture processes emphasize the catalytic role of the enzyme conducting to the increased performance of the $CO_2$ capture process. Enzyme lifetime in such processes is a key issue that has been mainly addressed by increasing the enzyme thermostability in several ways.

In a first strategy, the enzyme is used in the absorption zone of the process where the process temperature to which the enzyme is exposed is the lowest. This strategy is applied in different ways: the enzyme may be immobilized to the packing material, when the gas-liquid contactor is a packed column, in such a configuration the enzyme is always in the absorber and thus exposed to low temperature conditions. The enzyme may also be immobilized to micro-particles in suspension in the absorption solution. In such a configuration, once the absorption solution exits the absorber, the micro-particles are separated out of the $CO_2$-rich absorption solution and reinjected in the absorption solution prior to its feeding to the absorption unit. The enzyme may be used free or solubilized in the absorption solution and the enzyme is filtered out of the solution similarly to micro-particles. In this first strategy, the enzyme is only exposed to pH and temperature conditions present in the absorption zone of the process.

In a second strategy, the increase in enzyme stability is performed by using carbonic anhydrase enzymes robust to the process conditions selected from natural microorganisms or by genetically modifying carbonic anhydrase enzymes using directed evolution to develop enzymes robust to specific process conditions. The ultimate objective of this second strategy is to develop an enzyme active and robust to operation conditions in both the absorption and stripping zones of the process.

A third strategy consists in combining new robust enzymes obtained from the second strategy with immobilization techniques and use this robust immobilized enzyme in the absorption zone only or in both the absorption and stripping zones.

There is still room for improvements relating to biocatalyst-based $CO_2$ capture process implementations that would enhance the biocatalyst half-life when submitted to operational conditions.

SUMMARY

Implementations of the biocatalyst-based $CO_2$ capture process respond to the above need by providing process design options tailored to minimize or avoid exposure of a biocatalyst-containing solution to bubble-formation conditions at which new gas-liquid interfaces are created via bubble formation, thereby enhancing the lifetime of the biocatalyst. Bubble-formation conditions are for example met when the biocatalyst-containing solution is boiled.

The present techniques relate to a biocatalyst-based $CO_2$ capture process which can include contacting a biocatalyst-containing $CO_2$-rich absorption solution with a stripping gas in a stripping system to create a driving force which desorbs $CO_2$ from the biocatalyst-containing $CO_2$-rich absorption solution, thereby producing a biocatalyst-containing $CO_2$-lean absorption solution and a $CO_2$-rich gas.

The stripping system includes a gas-liquid contactor which can be a gas-liquid direct contactor. A gas-liquid direct contactor refers to a unit enabling contact between the gas phase and the liquid phase in absence of any physical barrier (such as a membranes). In some implementations, the gas-liquid contactor can be chosen among a packed column, a tray column, a spray reactor, a rotating packed bed and a falling-film evaporator, for example.

The biocatalyst may be used in a soluble form or in an immobilized form, e.g., fixed on particles or entrapped inside a porous matrix. For both biocatalyst delivery forms, the biocatalyst can be provided to flow with the absorption solution in the absorption unit (in $CO_2$-rich absorption solution) and desorption unit (in $CO_2$-lean absorption solution).

In a first aspect, there is provided a $CO_2$ stripping method including generating the stripping gas, and contacting the $CO_2$-rich absorption solution with the stripping gas to produce the $CO_2$-lean absorption solution and the $CO_2$-rich gas.

Optionally, at least a portion or all of the stripping gas is generated from a portion of the $CO_2$-lean absorption solution. In some implementations of the $CO_2$ stripping method, generating the stripping gas includes feeding the portion of the $CO_2$-lean absorption solution to a stripping gas generation unit to produce the stripping gas, the method further comprising feeding the stripping gas to the gas-liquid contactor. The stripping gas generation unit can be a falling film evaporator and the gas-liquid contactor can be a packed column, a tray column, or a rotating packed bed.

Further optionally, the stripping gas is generated from the $CO_2$-rich absorption solution. In some implementations of the $CO_2$ stripping method, generating the stripping gas includes heating the $CO_2$-rich absorption solution in a gas-liquid contactor to produce the stripping gas and simultaneously strip the $CO_2$-rich absorption solution. The gas-liquid contactor can be a falling film evaporator.

In some implementations, the absorption solution is a biocatalyst-based aqueous solution and the generated stripping gas can therefore include steam.

In another aspect, there is provided a $CO_2$ stripping method including condensing at least a portion of the $CO_2$-rich gas to produce a stripping liquid, generating the stripping gas from the stripping liquid, and contacting the $CO_2$-rich absorption solution with the stripping gas to produce the $CO_2$-lean absorption solution and the $CO_2$-rich gas.

In some implementations, generating the stripping gas from the stripping liquid is performed in a reboiler, the stripping gas being fed to the gas-liquid direct contactor. The gas-liquid direct contactor can be a packed column, a tray column, a spray reactor, or a rotating packed bed, for example.

In some implementations, the stripping liquid is a water-containing liquid which can be water or an aqueous solution, such as a salt solution (e.g., NaCl, KCl, $K_2CO_3$, $Na_2CO_3$).

In other implementations, the stripping liquid is an organic liquid compound. Optionally, the stripping liquid can be immiscible with water and have a lower density than water. Further optionally, the stripping liquid can be immiscible with water and have a higher density than water. For example, the organic liquid compound may be a hydrocarbon CxHy where x=5 or 6; or a halogenated hydrocarbon derivative, including hexane, cyclohexane, cyclopentane, cis-1,2-dichloroethene, 2-methyl pentane, trichloroethylene, $CHCl_3$, Perfluorohexane or an organosilicon such as Tetramethylsilane.

In some implementations, the stripping gas is fed to a plurality of spaced-apart locations, preferably distributed along a height of the gas-liquid contactor. In other implementations, the $CO_2$-rich absorption solution is withdrawn from different sections of the gas-liquid direct contactor to be heated and reinjected in the gas-liquid contactor via heating loops.

In a further aspect, there is provided a $CO_2$ stripping method including directly contacting the $CO_2$-rich absorption solution with the stripping gas to produce the $CO_2$-lean absorption solution and the $CO_2$-rich gas, the stripping gas being a non-condensable gas. It should be noted that direct contact refers to a contact between the gas phase and the liquid phase in absence of any physical barrier (such as a membranes).

In some implementations, directly contacting the $CO_2$-rich absorption solution with the stripping gas is performed in a packed column, a tray column, or a rotating packed bed (acting as gas-liquid contactor).

In some implementations, the non-condensable gas is air or nitrogen.

In a further aspect, there is provided a $CO_2$ stripping method including minimizing or avoiding exposure of the $CO_2$-rich absorption solution to bubble-formation conditions at which new gas-liquid interfaces are created via bubble formation, and stripping $CO_2$ from the $CO_2$-rich absorption solution.

In another aspect, there is provided a biocatalyst-based $CO_2$ capture process including contacting a $CO_2$-containing gas with an absorption solution to produce the $CO_2$-rich absorption solution, and using any one of the above-defined $CO_2$ stripping methods to desorb $CO_2$ from the $CO_2$-rich absorption solution, thereby producing the $CO_2$-lean absorption solution and the $CO_2$-rich gas.

In another aspect, there is provided a process for desorbing $CO_2$ from a biocatalyst-containing $CO_2$-rich absorption solution in an evaporator, the process comprising feeding the biocatalyst-containing $CO_2$-rich absorption solution to the evaporator, and heating the biocatalyst-containing $CO_2$-rich absorption solution to simultaneously generate a stripping gas and create a driving force to desorb $CO_2$ from the biocatalyst-containing $CO_2$-rich absorption solution. In some implementations, the evaporator can be a falling-film evaporator or analogs thereof.

In another aspect, there is provided a use of an evaporator to generate a stripping gas for stripping $CO_2$ from a biocatalyst-containing $CO_2$-rich absorption solution and produce a biocatalyst-containing $CO_2$-lean absorption solution. In some implementations, the evaporator is used to generate the stripping gas from the biocatalyst-containing $CO_2$-rich absorption solution. In other implementations, the evaporator is used to generate the stripping gas from the biocatalyst-containing $CO_2$-lean absorption solution. In some implementations, the evaporator can be a falling-film evaporator.

While the invention will be described in conjunction with example embodiments, it will be understood that it is not intended to limit the scope of the invention to such embodiments. On the contrary, it is intended to cover all alternatives, modifications and equivalents as may be included as defined by the present description. The objects, advantages and other features of the present invention will become more apparent and be better understood upon reading of the following non-restrictive description of the invention, given with reference to the accompanying drawings.

BRIEF DESCRIPTION OF THE DRAWINGS

Implementations of the biocatalyst-based $CO_2$ capture process and related units are represented in and will be further understood in connection with the following figures.

Figure 1:
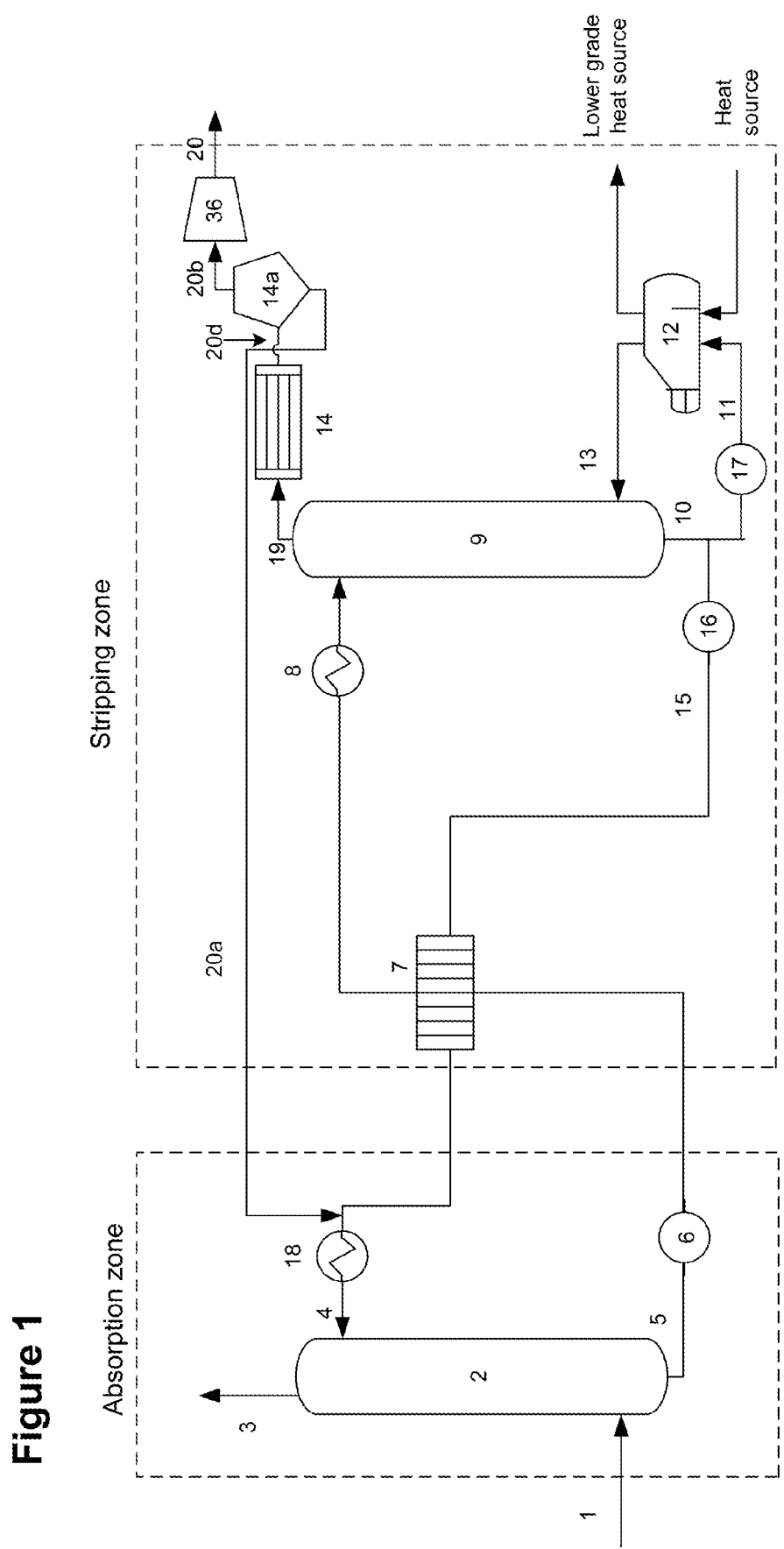
FIG. 1 is a simplified diagram of a biocatalyst-based $CO_2$ capture process comprising an absorption zone and a stripping zone (PRIOR ART).

While the invention will be described in conjunction with example embodiments, it will be understood that it is not intended to limit the scope of the invention to these embodiments. On the contrary, it is intended to cover all alternatives, modifications and equivalents as may be included as defined by the appended claims.

DETAILED DESCRIPTION

Present techniques relate to the field of biocatalyst-based $CO_2$ capture. The $CO_2$-containing gas may be a post-combustion flue gas, a process gas, a biogas or a natural gas from different sources. Specifically, the invention is related to a carbonic anhydrase-based $CO_2$ capture processes where the biocatalyst carbonic anhydrase is present in the absorption solution and flows with this solution through gas-liquid contactor. More specifically, this invention discloses methods/processes enabling increasing the biocatalyst process lifetime and decreasing the biocatalyst cost in the technology.

Recent investigations clearly demonstrated that, in addition to pH and temperature, a third parameter has a very important impact on the biocatalyst process stability: the generation rate of new gas-liquid interfaces. This phenomenon takes place in the absorption unit, the stripping unit and more importantly in the reboiler attached to the stripping unit which provides the stripping gas, usually steam, by boiling the absorption solution. It was clearly demonstrated that the rate of biocatalyst activity loss is directly related to the generated steam flow rate in the reboiler. In fact, it is the high boiling rate providing high gas-liquid interface generation rate that mainly causes the biocatalyst activity loss in the $CO_2$ capture process.

In the following description, the term "about" means within an acceptable error range for the particular value as determined by one of ordinary skill in the art, which will depend in part on how the value is measured or determined, i.e. the limitations of the measurement system. It is commonly accepted that a 10% precision measure is acceptable and encompasses the term "about".

In the above description, an embodiment is an example or implementation of the invention. The various appearances of "one embodiment," "an embodiment", "some embodiments" or "some implementations" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment.

It is worth mentioning that throughout the following description when the article "a" is used to introduce an element it does not have the meaning of "only one" it can rather mean of "one or more". It is also to be understood that where the specification states that a component, feature, structure, or characteristic "may", "might", "can" or "could" be included, that particular component, feature, structure, or characteristic is not required to be included.

The presently described biocatalyst-based $CO_2$ capture techniques includes controlling gas-liquid interface generation rate to impact the biocatalyst lifetime. More particularly, there are provided processes that minimize the generation of new gas-liquid interfaces and increase the biocatalyst lifetime in the process.

The present specification should be read in light of the following definitions:

Absorber or Absorption Unit

The absorber (also referred to herein as an absorption unit) is a gas-liquid contactor which can be a packed column, a tray column, or a rotating packed bed for example.

Stripper

The stripper (also referred to herein as a stripping unit or stripping column) is a gas-liquid contactor which can be a packed column, a tray column, a spray reactor, a rotating packed bed or a falling-film evaporator.

Absorption Solution

The absorption solution is an aqueous solution that may include at least one of the following compounds: $K_2CO_3$, $KHCO_3$, $Na_2CO_3$, $NaHCO_3$, tertiary amines, tertiary alkanolamines, tertiary amino acids. The absorption solution includes non-carbamate forming solutions.

$CO_2$-Rich Gas

The $CO_2$-rich gas is the gas phase leaving the stripper, prior to any subsequent treatments or process steps.

Biocatalyst

The biocatalysts that can be used in the present techniques are selected from the group consisting of enzymes, liposomes, micro-organisms, animal cells, plant cells and any combination thereof. The biocatalyst may be used in a soluble form or in the immobilized form i.e. fixed on a particle or entrapped inside a porous matrix. For both biocatalyst delivery forms, the biocatalyst is flowing with the absorption solution in the absorption and desorption units. It should be noted that the biocatalyst may preferably be an enzyme, such as carbonic anhydrase. The enzyme may be present in the absorption solution in an enzyme concentration of about 0-2 g/L, optionally about 0.05-1 g/L, further optionally about 0.1-0.3 g/L.

The enzyme carbonic anhydrase, which is of relatively low molecular weight, may be made to form part of a complex in order to increase its size. Different types of enzyme complexes may be formed. Among these are those using whole cells such as red blood cells. However, with red blood cells, the enzymes rapidly leak out and are lost. The carbonic anhydrase may be immobilized on a surface of the support material of the micro-particles, entrapped within the support material of the micro-particles, or a combination thereof. In another optional aspect, the carbonic anhydrase may also be provided as cross-linked enzyme aggregates (CLEAs) and the support material comprises a portion of the carbonic anhydrase and crosslinker. In still another optional aspect, the carbonic anhydrase is provided as cross-linked enzyme crystals (CLECs) and the support material comprises a portion of the carbonic anhydrase. The selected materials and methods must enable a stabilisation of the enzyme to make it more robust towards process conditions, enable the enzyme to remain immobilized i.e. fixed or entrapped to/in the support material when used in the process. In other words, materials and chemical bonds (if chemical method is used) must remain stable for a long period of time to provide an enzyme long term stability in the process.

The present invention provides processes to reduce the rate of biocatalyst activity loss in $CO_2$ capture processes by proposing alternate process configurations where boiling is nearly absent and where the biocatalyst, in the absorption solution, is flowing through the absorption and desorption units. Three options are discussed here below.

In a first option, the steam is produced by sending the $CO_2$-lean absorption solution to an evaporator instead of a reboiler. A reboiler is commonly used in $CO_2$ capture processes to generate steam from the $CO_2$-lean absorption solution. The steam is generated when the absorption solution is boiled i.e. when water vapor bubbles are formed in the solution. The generation of these steam bubbles lead to the generation new gas/liquid interfaces (steam bubbles from absorption solution) which were found to be detrimental to the biocatalyst. To minimize bubble formation, reboiler (12) (FIG. 1) might be replaced by an evaporator where the operation conditions are adjusted such that the steam is produced via evaporation i.e. water evaporates at the surface of the aqueous solution. Under such operation conditions, the generation of new gas/liquid interfaces is minimum and is solely due to the flow of the absorption solution in the evaporator. Bubble formation is almost excluded from such a device and as such the carbonic anhydrase enzyme is minimally exposed to new gas/liquid interfaces.

In a second option, the stripping gas is not provided following evaporation or boiling of the absorption solution but from an external stripping gas loop where the stripping gas is condensable such as water. The absorption solution is not fed to a reboiler and thus is not exposed to any boiling conditions. The reboiler (12) (FIG. 1) is removed from the process configuration.

In a third option, the reboiler (12) (FIG. 1) is removed from the process and the stripping gas required to the stripping unit is a non-condensable gas. The absorption solution is not exposed to any boiling conditions. The stripping gas is a non-condensable gas such as air or nitrogen.

The operation conditions in the absorption unit may include an absorption temperature of about 10-60° C. and an absorption pressure of about 1-40 bars. The operation conditions in the stripping unit: may include a stripping temperature of about 50-80° C. and a stripping pressure of about 0.1-1 atm.

Option 1: Falling-Film Evaporator

In a first option, it is proposed to replace the reboiler by an evaporator. Evaporators are used in many industries such as food, chemical, pharmaceutical and dairy industries for concentrating solutions or slurries. In such applications, water has to be removed from these solutions or slurries to obtain a product of a desired quality. In these applications, the water vapor is rejected whereas the concentrated solution is the final product. For example, for the preparation of condensed milk over 45% of the water is evaporated from natural milk.

Different types of evaporators may be used, these are: forced circulation, natural circulation, wiped film, rising film tubular, falling film tubular, rising/falling film tubular, rising film plate evaporator, falling film plate evaporators and rising/falling film plate evaporators. Among these, falling-film evaporators (tubular or plate) are preferred because they provide a very short residence time within the equipment, good heat transfer coefficients and they can operate under vacuum conditions where water evaporation takes place at lower temperatures as compared to atmospheric pressure or higher pressure. It has gained wide acceptance for the concentration of heat sensitive products in food industry.

Figure 2:
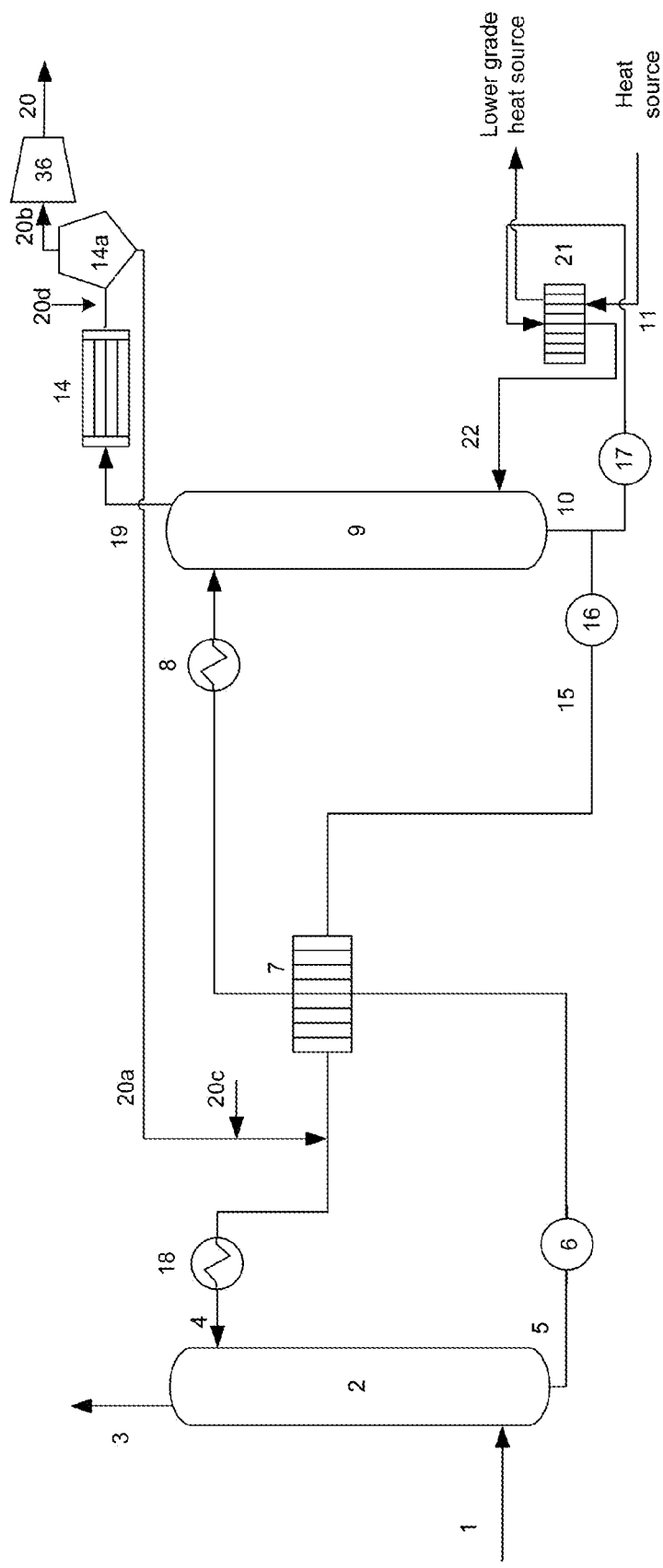
FIG. 2 is a simplified diagram of a biocatalyst-based $CO_2$ capture process where the reboiler is replaced by a falling-film evaporator.
Figure 2A:
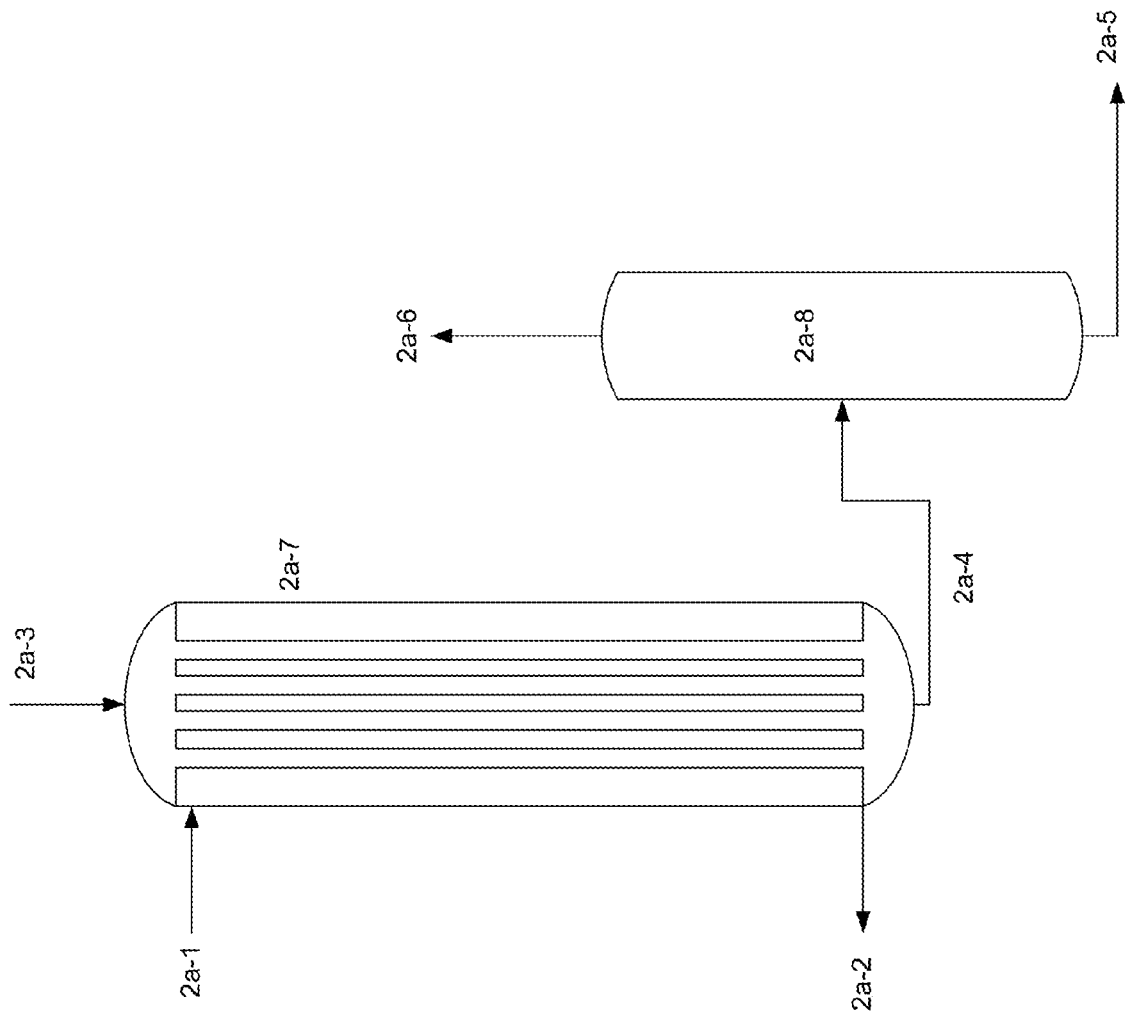
FIG. 2a is a schematic representation of a falling film evaporator.

A schematic representation of a tubular falling-film evaporator is provided in FIG. 2a. The tubular falling-film evaporator (2a-7) is composed of a shell and tubes. The liquid to be concentrated (2a-3) is fed at the top of the evaporator to a distributor. The distributor is designed to enable an even distribution of liquid to each tube. This is important to avoid any dry region on the surface of the tubes which would result in a lower performance. The liquid is fed inside the walls where it forms a film. The liquid film is going down with gravity. The downward flow is enhanced by the parallel downward flow of the vapour formed. This results in a thinner, faster moving film and enable shorter liquid contact time and an improvement in heat transfer coefficients. A heating fluid (2a-1), which might be steam, hot water or any hot fluid having the energy to enable the water to evaporate from the liquid, is fed to the shell and provides the thermal energy required to heat the liquid to be concentrated and evaporate water from the liquid. The liquid/steam mixture exits the system (2a-4). The heating fluid, now in a condensed form and/or at a lower temperature exits the shell at the bottom (2a-2). The residual film liquid and vapour are separated in the lower part of the shell and in the downstream droplet separator (2a-8). The concentrated liquid (2a-5) exits at the bottom of the separator while the vapour (2a-6) is collected at the top of the separator. Part of the concentrated liquid may be recycled back to the inlet of the evaporator to ensure sufficient wetting of the tubes is maintained. Particularities of a falling film evaporator are a gentle evaporation mostly conducted under vacuum conditions, extremely short residence times of the liquid in the evaporator, low pressure drop, high energy efficiency allowing to operate under low temperature difference between process and heating fluid, simple process control and automation, flexible operation. This type of evaporator is particularly suited for temperature-sensitive products.

Based on the above advantages of the falling-film evaporator, the reboiler can be replaced by a falling-film evaporator. The corresponding process configuration is shown in FIG. 2. First, a $CO_2$-containing gas (1) is fed to an absorption unit (2). The gaseous $CO_2$ is absorbed by the absorption solution (4) flowing counter-currently. The treated gas (3), lean in $CO_2$, is discharged from the $CO_2$ capture process to the atmosphere or sent for use or additional treatments. The $CO_2$-rich absorption solution (5) is pumped (6) and flow through two heat exchangers (7) and (8) to increase its temperature prior its entrance in the stripping unit (9). Heat exchanger (8) is optional. In the case wherein heat exchanger (8) is used and enables evaporation of part of the water from the solution, the produced vapor might be recovered and injected at a lower location in the packing of the stripping unit (9) to act as the stripping gas (not illustrated). The $CO_2$-lean absorption solution (10) exits the stripping unit (9). A fraction of the stream (10), stream (11), is pumped (17) to the evaporator (21) where the solution is heated and water is vaporised. Stream (22) is produced. Stream (22) comprises steam, a concentrated lean absorption solution and may also comprise gaseous $CO_2$. Stream (22) steam is collected and sent to the stripping unit (9). The $CO_2$-rich gas (19) leaving the stripping unit (9) can be fed to a condenser (14) where the steam is condensed. The gas-liquid stream (20d) in then sent to a separator (14a) where the high $CO_2$ concentration gas (20b) exits the separator (14a) and is sent via compressor/vacuum pump 36 for further use or treatment as stream (20). The condensed steam (20a) is returned back to the process to be mixed with the regenerated absorption solution (4). Stream (20c) is the process water make-up.

In an alternate configuration which is not illustrated, stream (22) could be fed to a separator wherein gas and liquid phases would be separated and collected separately. The liquid phase (concentrated solution) could be sent back in the reservoir at the bottom of the stripping unit (9) or mixed with stream (10) or (15) to be sent towards the absorption unit (2). The gas phase could then be sent back to the stripper (9). Contrarily to the food, dairy, pharmaceutical and chemical industries, the gas and liquid phases are both reinjected in a same process unit (the stripping unit (9)) whereas in food industry the concentrated solution and steam have different fates. Another difference with conventional use is that less than 20% (weight) of the solution needs to be evaporated.

Option 2: Stripping Gas Loop

Figure 3:
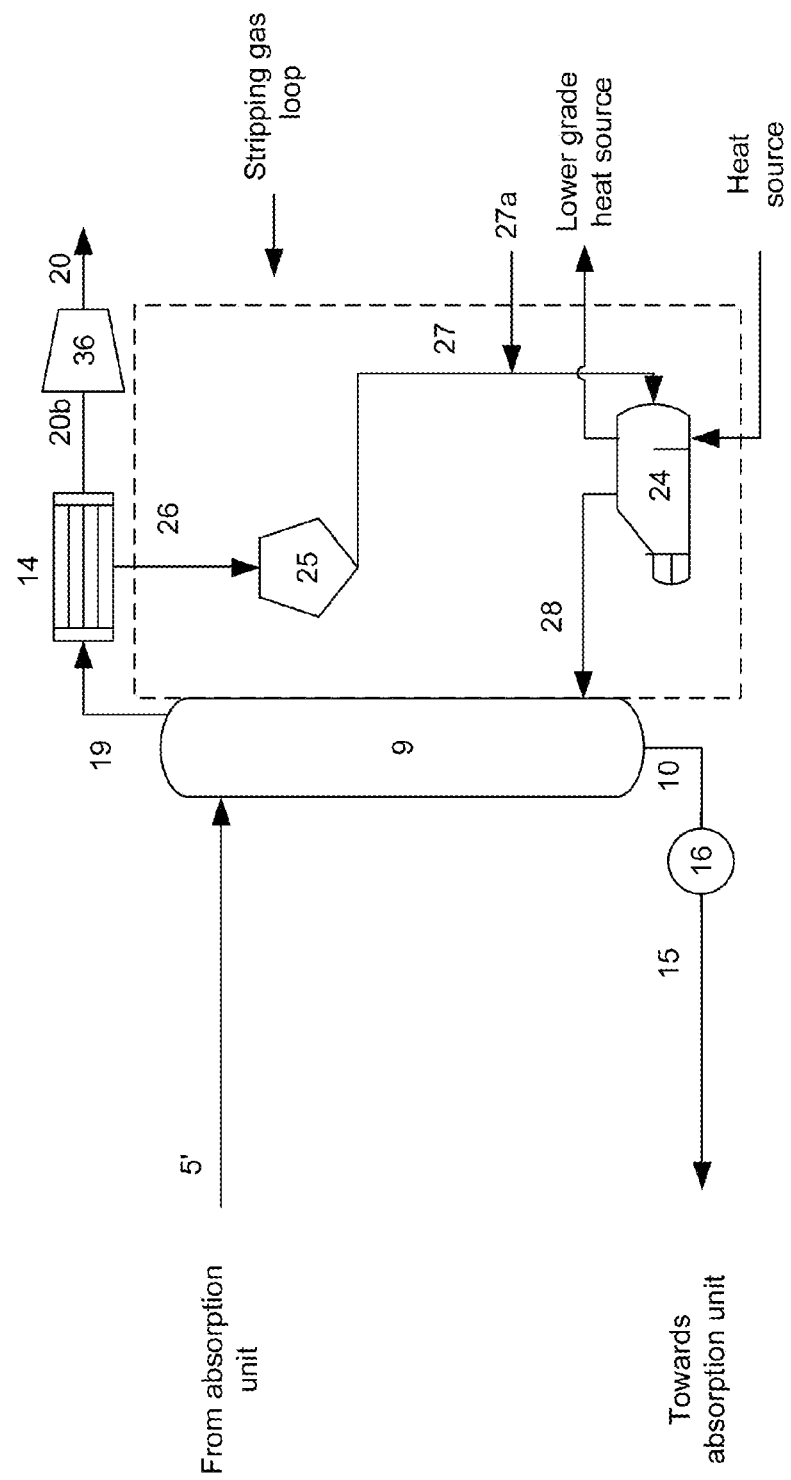
FIG. 3 is a diagram of a stripping unit configuration where the stripping gas required for the stripping unit is provided via a stripping gas loop, according to a first implementation.

In a second option, the reboiler is removed from the process and replaced by an external stripping gas loop (FIG. 3). The stripping gas loop consists in a process where a stripping liquid is used to produce the stripping gas. The stripping liquid in reservoir (25) is sent (27) to a reboiler (24) and boiled to produce a vapor acting as the stripping gas (28) which is injected at the bottom of the stripping column (9). The stripping gas flows upward through the stripping column where it contacts the $CO_2$-rich absorption solution (stream 5') enabling $CO_2$ desorption and water evaporation from the solution. The stripping vapor/water vapor/$CO_2$ mixture (19) exits the stripping column and is sent to a condenser (14). The stripping gas and water vapor are condensed (26) and transferred to a reservoir (25). The reservoir contains the stripping liquid and liquid water. Depending on nature of the stripping liquid, different process configurations might be adopted as will be described below. The high concentration $CO_2$ gas (20b) is compressed (36) and exits the process (stream 20) for further uses or storage. The $CO_2$-lean absorption solution leaves the stripping unit (stream 10) and is pumped (pump 16) towards the absorption unit (stream 15). Stream (27a) is a make-up stream for the stripping liquid.

It should also be noted that stream (27) may be heated, to have a temperature closer to the reboiler temperature, using a heat exchanger prior to its entrance in the reboiler (not illustrated in FIG. 3).

Figure 3A:
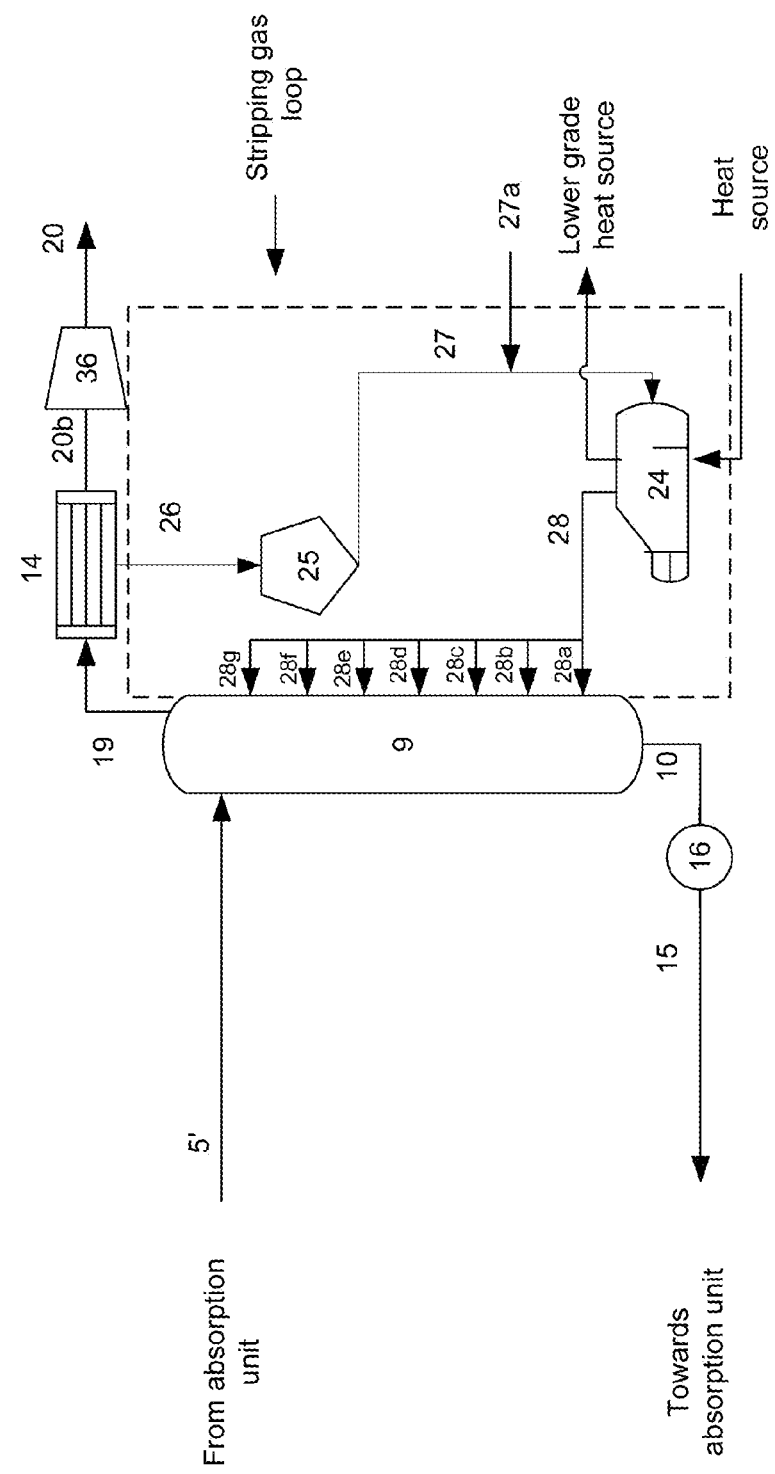
FIG. 3a is a diagram of a stripping unit configuration where the stripping gas required for the stripping unit is provided through a stripping gas loop, according to a second implementations wherein the stripping gas is injected through a plurality of injection ports distributed along a height of the stripping unit.

In a first embodiment, the stripping vapor (28) might be injected at different heights (28a to 28g) along the stripping column as shown in FIG. 3a. This configuration enables to minimize the temperature gradient throughout the stripping column and increase the stripping performance. The steam, acting as the stripping gas, moves upward through the stripping column and contacts the $CO_2$-rich absorption solution. As the absorption solution flows downward, and because of the $CO_2$ concentration gradient between the stripping gas and the absorption solution, $CO_2$ is desorbed. Steam may also condensate into the solution. The $CO_2$ rich gas (19) exiting the stripping column (9) contains stripping gas, water vapor and $CO_2$; and is sent to the condenser (14) where water is condensed and a high $CO_2$ concentration gas (20b) is produced. The high $CO_2$ concentration gas (20b) is then compressed in compressor (36) and sent as stream (20) to additional units for use, treatment and/or storage.

Figure 3B:
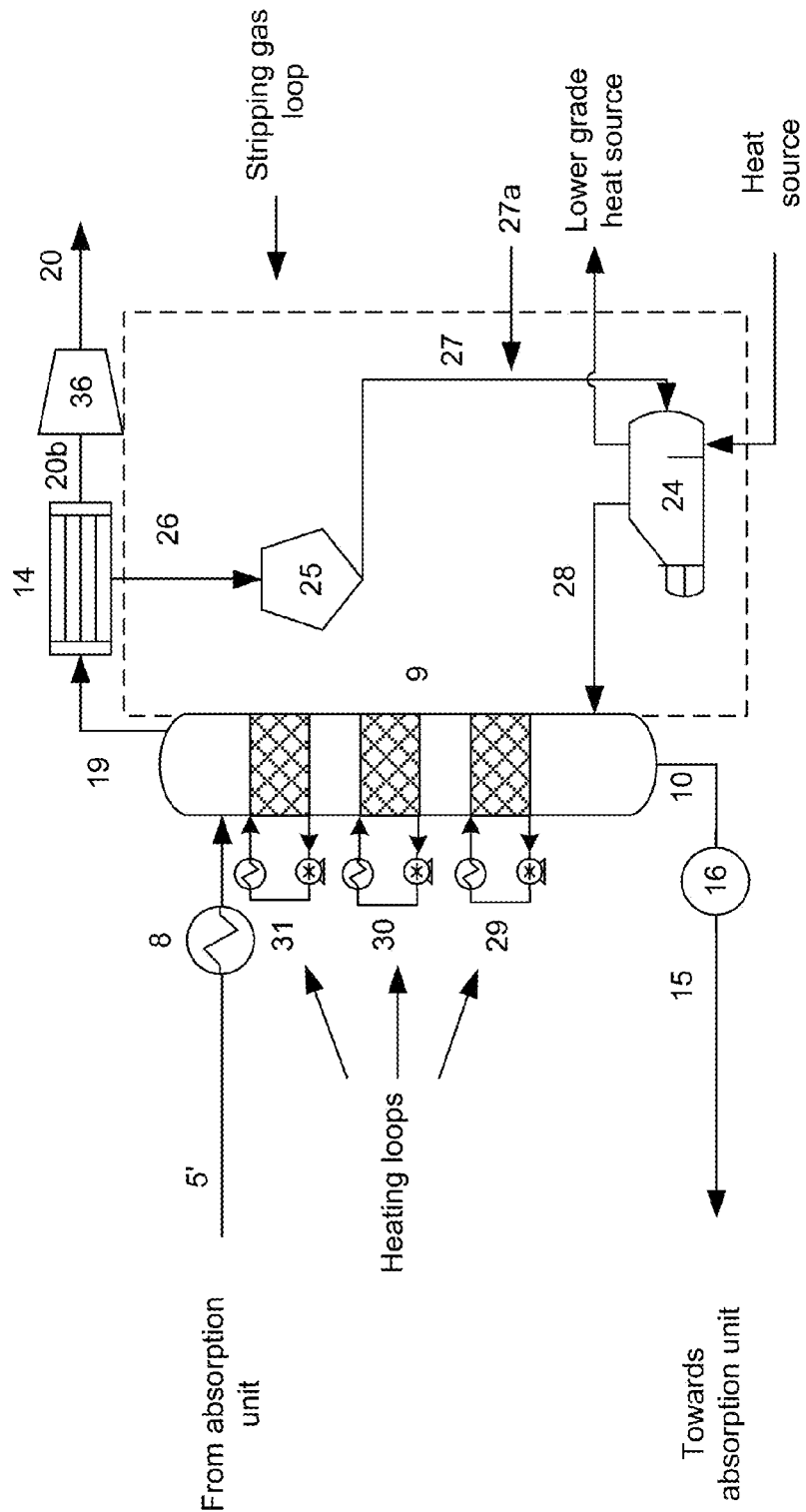
FIG. 3b is a diagram of a stripping unit configuration where the stripping gas required for the stripping unit is provided via a stripping gas loop according to a third implementation wherein the absorption solution is withdrawn from different sections of the stripping unit to be heated and reinjected in the stripping unit via heating loops.

In another embodiment shown in FIG. 3b, the stripping vapor (28) is injected at the bottom of the stripper. However, in different sections of the stripping column, the absorption solution is withdrawn using a pump and then heated using a heat exchanger and then returned to the stripping unit. Several heating loops such as 29, 30 and 31 might be present along the height of the stripping column. The absorption solution may be withdrawn at the bottom of a packing bed and reinjected at the top of the same packing bed. Alternatively, the absorption solution may be withdrawn at the top of a packing bed and reinjected at the bottom of the same packing bed.

For both embodiments, the number of heating loops or injection ports depends on the column height, the energy needed to be injected and the process economics.

The two previous embodiments i.e. different injection locations and heating loops might also be applied to process configuration shown in FIG. 2.

Regarding the nature of the stripping liquid, the key properties for an adequate stripping liquid are the following:

It has to be in a vapor or gas phase under the stripping operation conditions.

The vapor or gas phase has to be easily condensable at a temperature slightly lower than the stripping temperature.

Stripping liquids might be selected from water, aqueous solutions and liquid organic compound having adequate properties. The liquids or solutions may be separated in two classes: water miscible and water immiscible. Depending on the properties of the liquids or solutions, different process configurations are possible as described below.

Stripping Liquid: Water-Containing Liquid

In a first embodiment, the stripping liquid comprises water. It might be pure water or an aqueous solution such as a salt solution (NaCl, KCl, $K_2CO_3$, $Na_2CO_3$). Salt concentration may be adjusted to reach the desired boiling temperature. When an aqueous solution is used as the stripping liquid, its composition or the salt concentration is adjusted such that the boiling temperature of the solution is slightly higher than the operation temperature of the stripping unit.

The stripping vapor leaving the reboiler has a temperature equal to the stripping temperature or slightly higher to produce a superheated vapor. Preferably the temperature of the stripping vapor leaving the reboiler is at most 15° C. higher than the stripping temperature, more preferably at most 10° C. higher than stripping unit, and most preferably at most 5° C. higher than the stripping temperature. The process would be as described in FIGS. 3, 3a and 3b. Since the stripping process is endothermic, there is a possibility that the stripping vapor condenses in the stripping unit. As a consequence, water would be mixed with the aqueous based absorption solution, diluting the absorption solution and consequently alter the process performance. To mitigate the impact of water condensation and absorption solution dilution, different process configurations are disclosed and shown in FIGS. 4, 4a and 4b.

Figure 4:
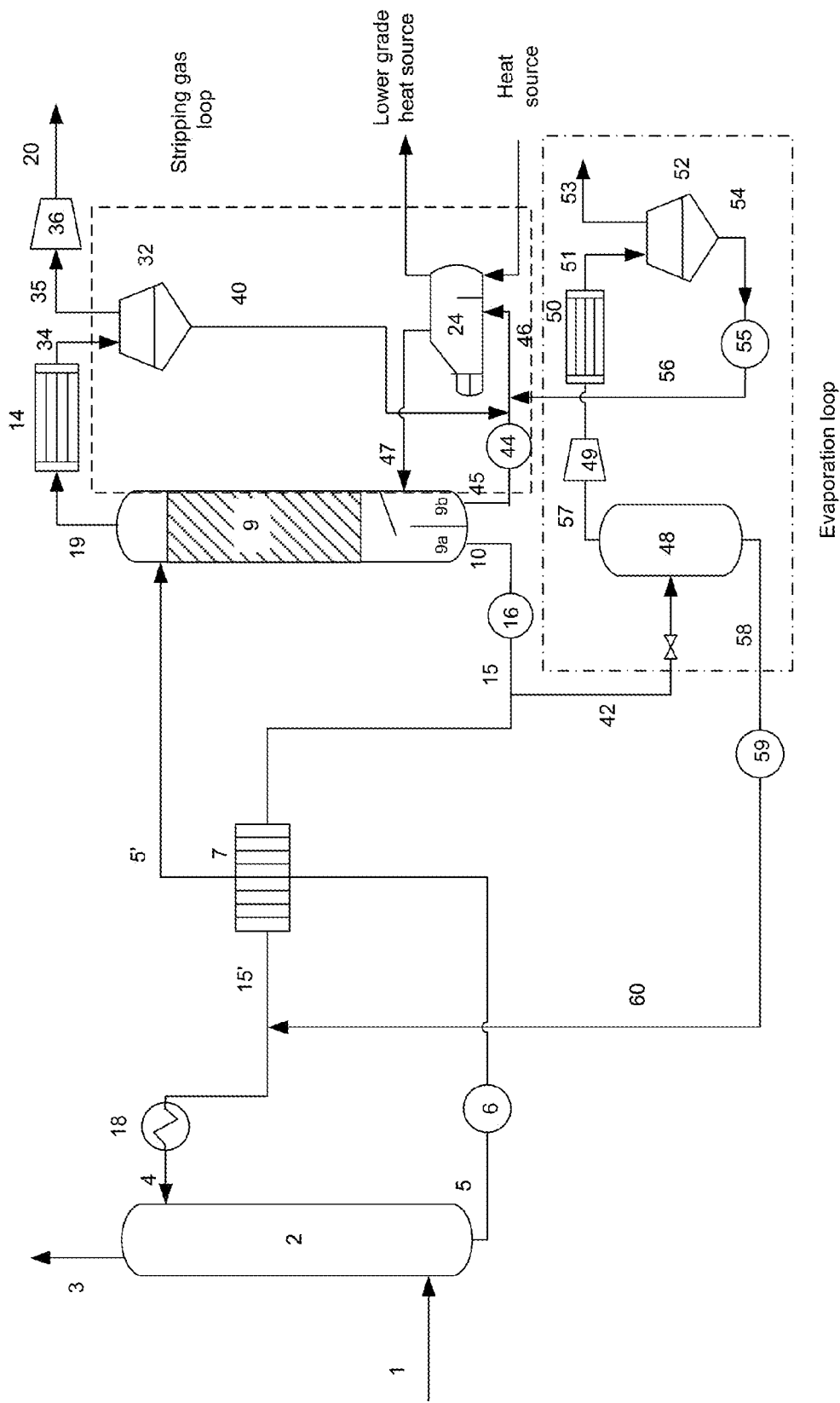
FIG. 4 is a diagram of a biocatalyst-based $CO_2$ capture process including a stripping gas and an evaporation loop according to a first implementation.
Figure 4A:
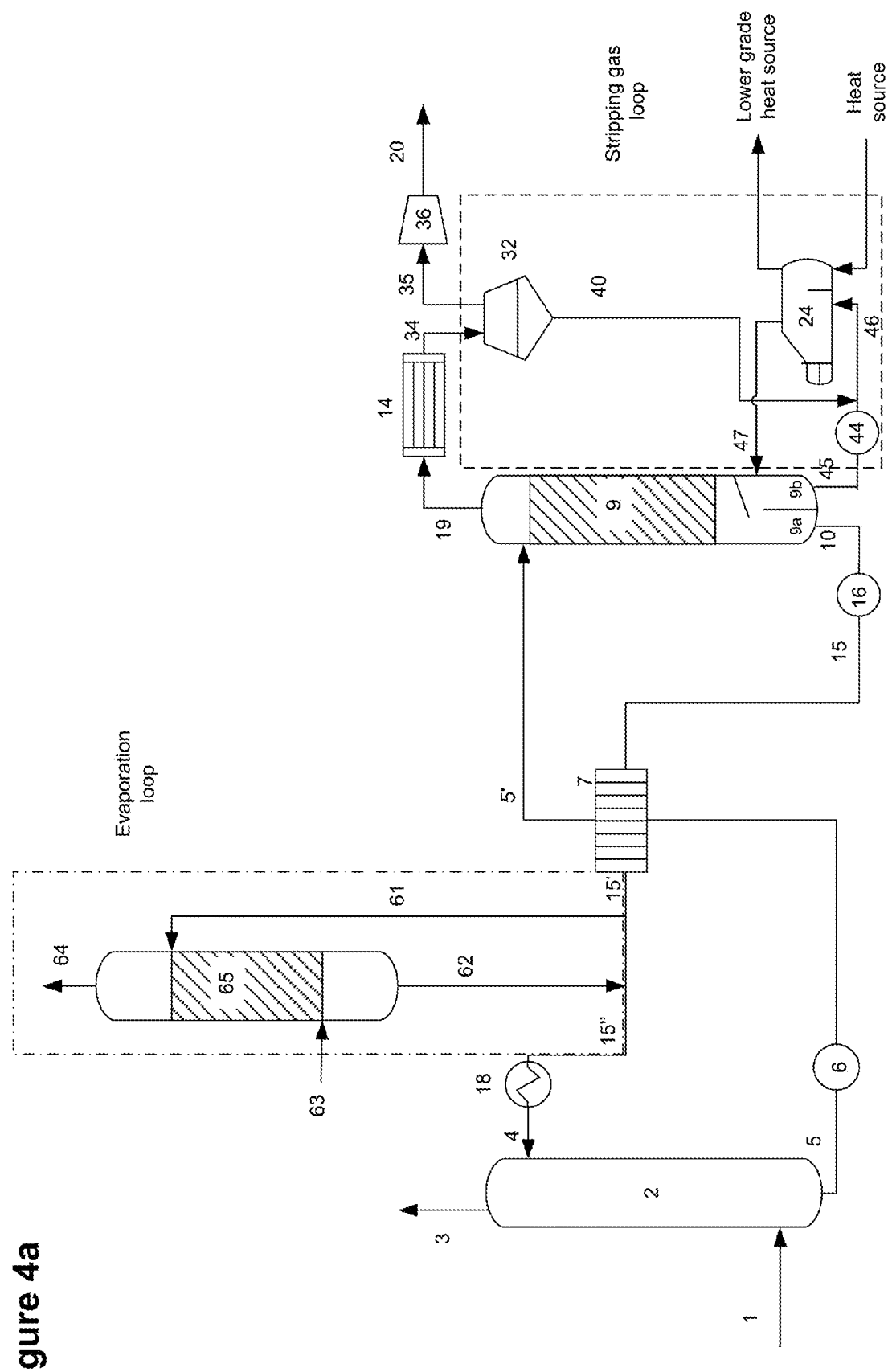
FIG. 4a is a diagram of a biocatalyst-based $CO_2$ capture process including a stripping gas and an evaporation loop according to a second implementation.
Figure 4B:
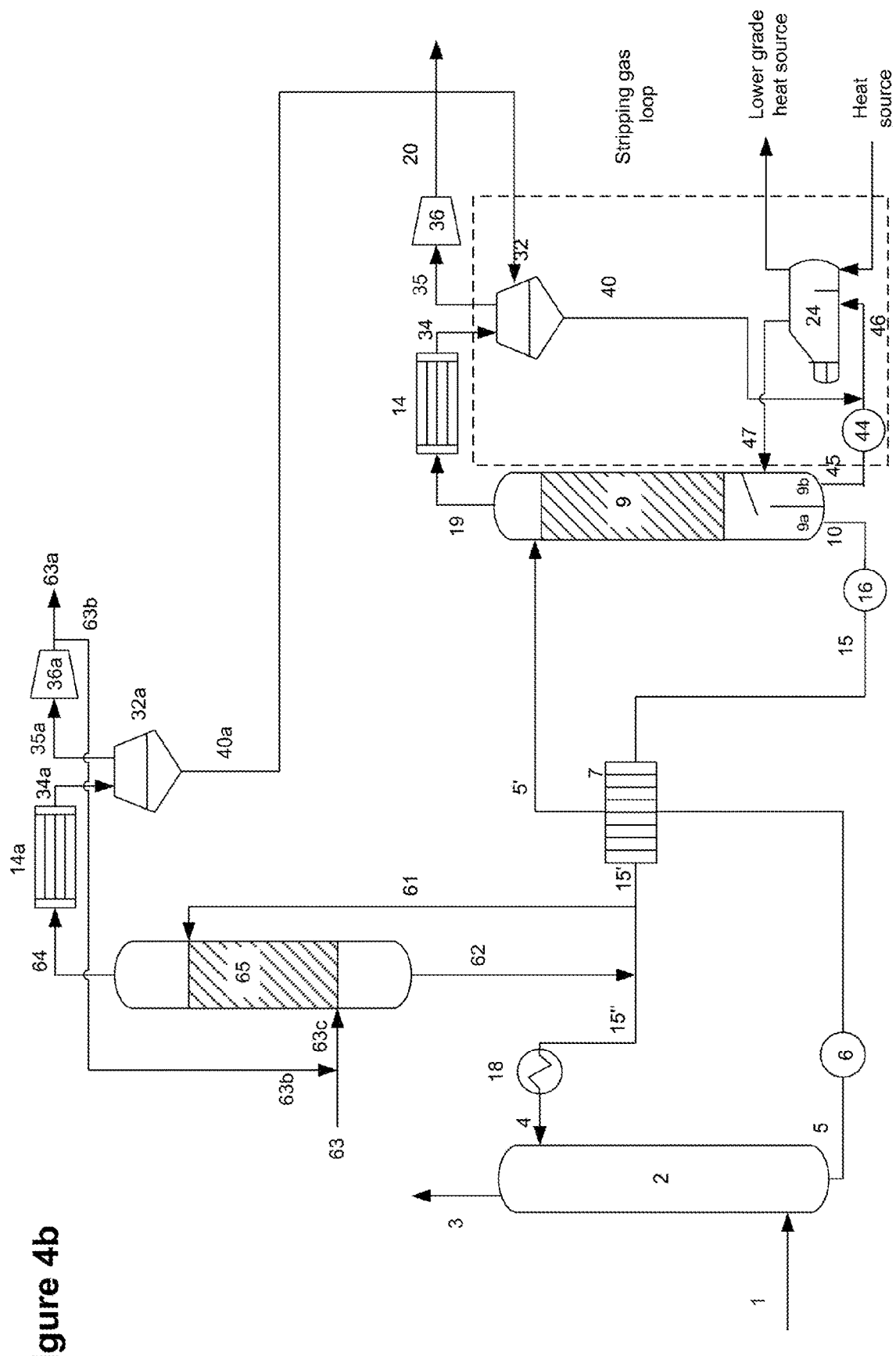
FIG. 4b is a diagram of a biocatalyst-based $CO_2$ capture process including a stripping gas and an evaporation loop according to an alternate implementation where the gas used in the evaporation loop is used in a closed loop system.

Referring to FIGS. 4, 4a and 4b, steam is produced in a stripping gas loop where the stripping liquid is water or a salt solution. The process further comprises an evaporation loop to maintain the quality of the absorption solution prior to being fed to the absorber.

A first process configuration is shown in FIG. 4. The description is focused around the Stripping Gas Loop and the management of the condensed stripping vapor in the Evaporation Loop. At the bottom of the stripping column, the reservoir is separated in two compartments 9a and 9b. Compartment 9a contains $CO_2$-lean absorption solution and compartment 9b contains stripping liquid which may be water or an aqueous solution. The liquid in compartment 9b is pumped (pump 44) to the reboiler (24). The liquid is boiled, water vapor (steam) is produced (47) and is injected as the stripping vapor at the bottom of the stripping column (9). The temperature of the water vapor depends on the solution composition and the operation temperature at the reboiler. The stripping vapor flows upward and contacts the $CO_2$ containing absorption solution flowing downward. As both streams contact, $CO_2$ is released from the absorption solution, water may evaporate from the absorption solution, the stripping vapor cools down and a fraction of the stripping vapor might condense and combine with the absorption solution. The stripping vapor leaves the stripping column, with the released $CO_2$ gas and the water vapor (19). The gaseous mixture (19) is sent to a condenser (14) where steam and stripping vapor are condensed. The gas/liquid mixture (34) is sent to a reservoir (32) where the liquid and gas phases are separated. The high $CO_2$ concentration gas phase (35) leaving the reservoir (32) is compressed (36) and sent (stream 20) to additional treatment units, processes or storage units. The liquid phase (40) leaving the reservoir is then mixed with stream (45) prior to its entrance in the reboiler (24). The $CO_2$-lean absorption solution (10), which might have an increased water content because of the condensed stripping vapor, is pumped (pump 16) and sent towards heat exchangers (7) and (18) before being fed to the absorption unit (2). A fraction of stream (15), stream (42), is sent to an evaporation loop.

The purpose of the evaporation loop is removing the water added to the absorption solution in the stripping column and recovering the original absorption solution composition. The evaporation loop comprises a flash drum (48) operated at a pressure lower than the stripping unit pressure. Upon entering into the flash drum (48), a fraction of the water present in solution is vaporised. The liquid phase (58) leaving the flash drum (48) having a decreased water content is pumped (pump 59) and stream (60) is mixed with stream (15'). The steam generated in the flash drum (57) is sent to a compressor (49) and then to a cooling unit (50) where water is partially condensed. The gas/liquid mixture (51) is sent to a reservoir (52) where the gas and liquid phases are separated. The gas phase (53) is released to the atmosphere. Stream (53) comprises $CO_2$ and water vapor. The liquid phase (54), mainly composed of water, is recovered, pumped (stream 56) and ultimately mixed with streams (45) and (40) in the stripping gas loop. Alternatively, stream (54) may be mixed with stream (15').

In an alternate configuration, the flash drum can be replaced with a falling-film evaporator.

A second process configuration is shown in FIG. 4a. This second embodiment is similar to the embodiment of FIG. 4, regarding the stripping gas loop. In this second embodiment, the extra water present in absorption solution is removed after its circulation through the heat exchanger (7) but prior to its entrance in the cooler (18). A fraction of stream (15') is sent toward a packed column (65). Stream (61) is fed at the top of the column and flows downward through the packing material. As it flows, it contacts a dry gas or a gas below its water saturation level (63). A fraction of the water present in the absorption solution is vaporised and exits the packed column with the gas stream (64). Stream (64) might be released to the atmosphere or recovered for additional treatments. The absorption solution leaving the packed column (62), having a decreased water content, is mixed with the $CO_2$-lean absorption stream (15'). The mixture (15") is then cooled and fed to the absorption column (2).

A third process configuration is shown in FIG. 4b. This third embodiment is similar to the embodiment of FIG. 4a. As for the previous embodiment, the extra water present in the $CO_2$-lean absorption solution (15) is removed after its circulation through the heat exchanger (7) but prior to its entrance in the cooler (18). A fraction (61) of stream (15') is sent toward a packed column (65). Stream (61) is fed at the top of the column and flows downward through the packing material. As it flows, it contacts a dry gas or a gas below its water saturation level (63c). A fraction of the water present in the absorption solution is vaporised and exits the packed column with the gas stream (64). Stream (64) might be recovered and sent to a heat exchanger (14a) where the gas is cooled down and steam is condensed. The gas/liquid mixture (34a) is sent to a gas/liquid separator (32a). The gas stream (35a) leaving the separator (32a) is fed to a fan (36a). It may then be partially discharged to the atmosphere (63a) and/or sent back (63b) towards the entrance of the packed column (65). The water stream (40a) leaving the separator (32a) is sent back to the stripping gas loop in reservoir (32). Alternatively and not illustrated, part of stream (40a) may be mixed with stream (62) or (15"). The lean absorption solution (62) leaving the packed column (65), having a decreased water content, is mixed with the $CO_2$-lean absorption stream (15') to form the mixture (15"). The mixture (15") is then cooled in the cooler (18) and fed to the absorption column (2). Stream (63) is a gas make-up stream.

Stripping Liquid: Liquid Organic Compound

To be considered as a suitable stripping liquid, the liquid organic compound must fulfill the following criteria:
  Be in a vapor or gaseous state under the stripping unit operation conditions.
  Be in a liquid state at temperatures slightly below the operation temperature of the stripping column.
  Be non-miscible with aqueous solutions. This property will facilitate the separation of the organic compound from the aqueous solution and prevent the dissolution of the compound in the aqueous solution.

Based on the previous criteria, the organic compound might be:
  a hydrocarbon CxHy where x=5 or 6
  a halogenated hydrocarbon derivative
  any other compound meeting the above criteria Some candidate compounds are hexane, cyclohexane, cyclopentane, cis-1,2-dichloroethene, 2-methyl pentane, trichloroethylene, $CHCl_3$, Perfluorohexane and Tetramethylsilane.

Figure 5:
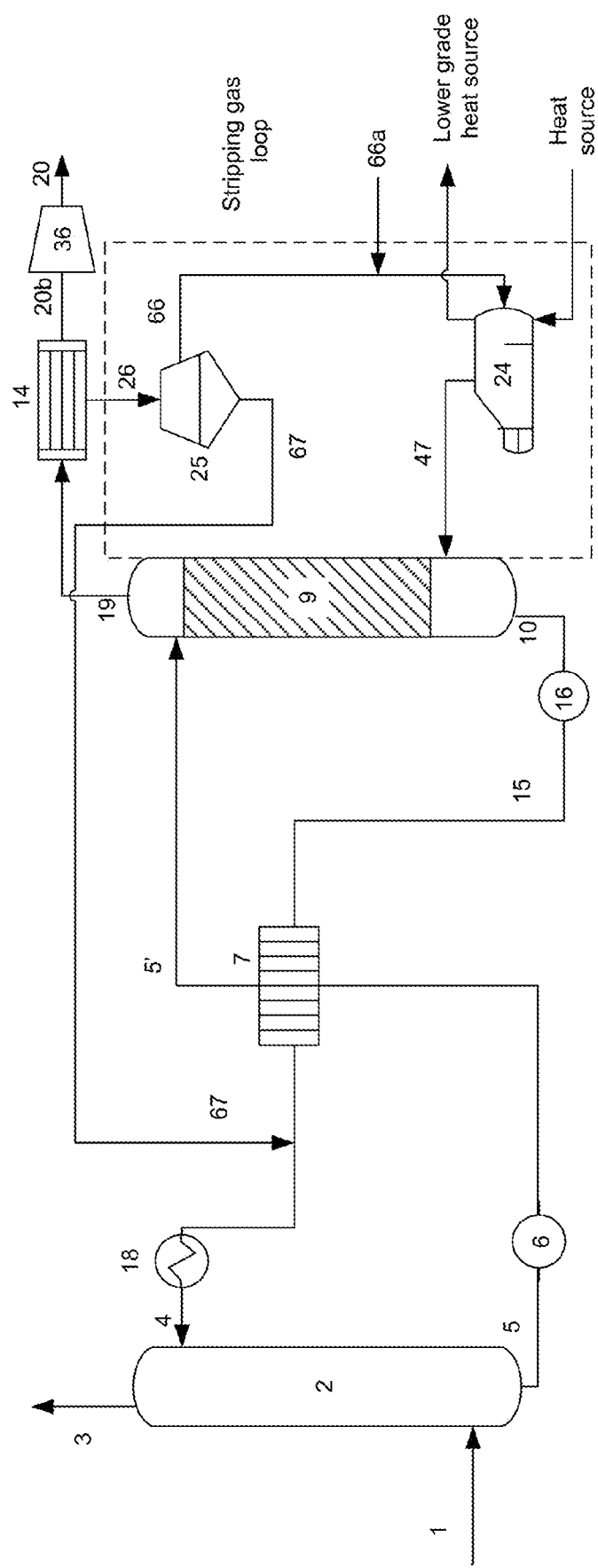
FIG. 5 is a diagram of a biocatalyst-based $CO_2$ capture process where the stripping gas required for the stripping unit is provided by a stripping gas loop and where the stripping liquid is immiscible with water and has a lower density than water.
Figure 5A:
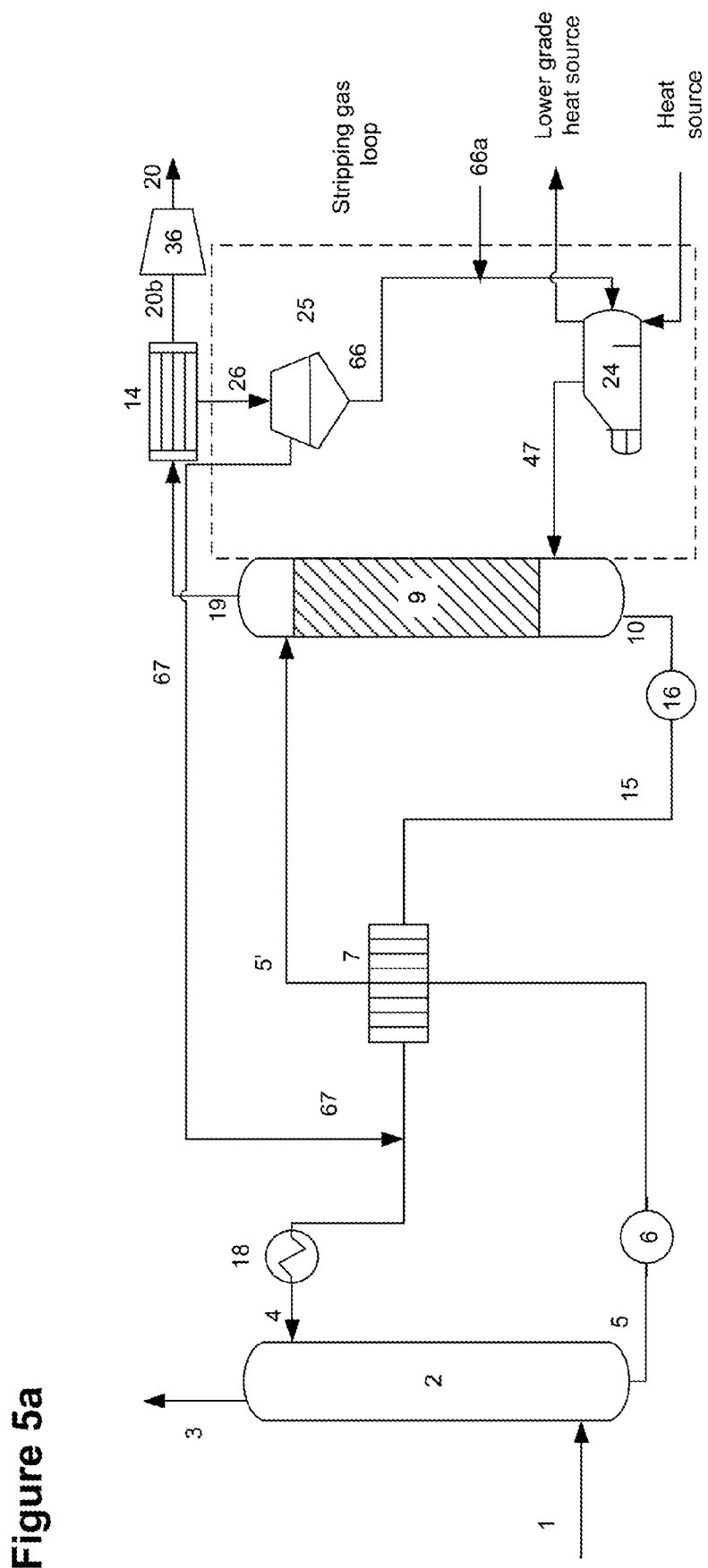
FIG. 5a is a diagram of a biocatalyst-based $CO_2$ capture process where the stripping gas required for the stripping unit is provided by a stripping gas loop and where the stripping liquid is immiscible with water and has a higher density than water.

The implementation of this strategy is shown in FIG. 5. The description is focused around the stripping unit and the stripping gas loop and the management of the condensed stripping vapor. The stripping liquid is stored in reservoir (25). It is transferred (stream 66) to the reboiler (24). The stripping liquid is boiled and vapor, or the stripping vapor, is produced (47) and injected at the bottom of the stripping column (9). The stripping vapor temperature is higher than the operation temperature in the stripping column (9). The stripping vapor flows upward and contact the $CO_2$ containing absorption solution (5') flowing downward. As both streams contact, $CO_2$ is released from the absorption solution, water evaporates from the aqueous absorption solution, the stripping vapor is cooled down but remains in a gaseous state in the system. The stripping vapor does not condense as its boiling temperature is below the temperature in the stripping column. The stripping vapor leaves the stripping column, with the released $CO_2$ gas and the water vapor (19). The $CO_2$-rich gas (19) is sent to a condenser where the steam and stripping vapor are condensed into water and a stripping liquid. Water and stripping liquid (26) are transferred to reservoir (25). As the two liquid phases are non-miscible, they can be separated and then separately used. In the case the stripping liquid has a lower density than water, the stripping liquid (66) is collected in the upper part of the reservoir and then fed to the boiler (24). Water is recovered (67) and combined with the $CO_2$-lean absorption solution between heat exchanger (7) and (18). The high $CO_2$ concentration gas (20b) is compressed (36) and then exits the process (20) for further use, treatment or to be stored. In the case, the stripping liquid is denser than water, the process would be as shown in FIG. 5a. For both cases, stream (66a) provides the stripping liquid make-up.

For both configurations, heat exchanger (8) (as shown in FIGS. 1 and 2) might be added to heat the rich absorption solution fed at the stripper (9). A heating loop, similar to what is shown in FIG. 3b, might be added at the bottom of the stripper, to heat the lean absorption solution present in the reservoir below the packing material. These additions might be required to maintain the adequate temperature conditions in the stripping unit. These additional steps and related equipment may be combined with the various process embodiments disclosed herein wherein the stripper is a packed column.

Option 3: External Stripping Gas

Figure 6:
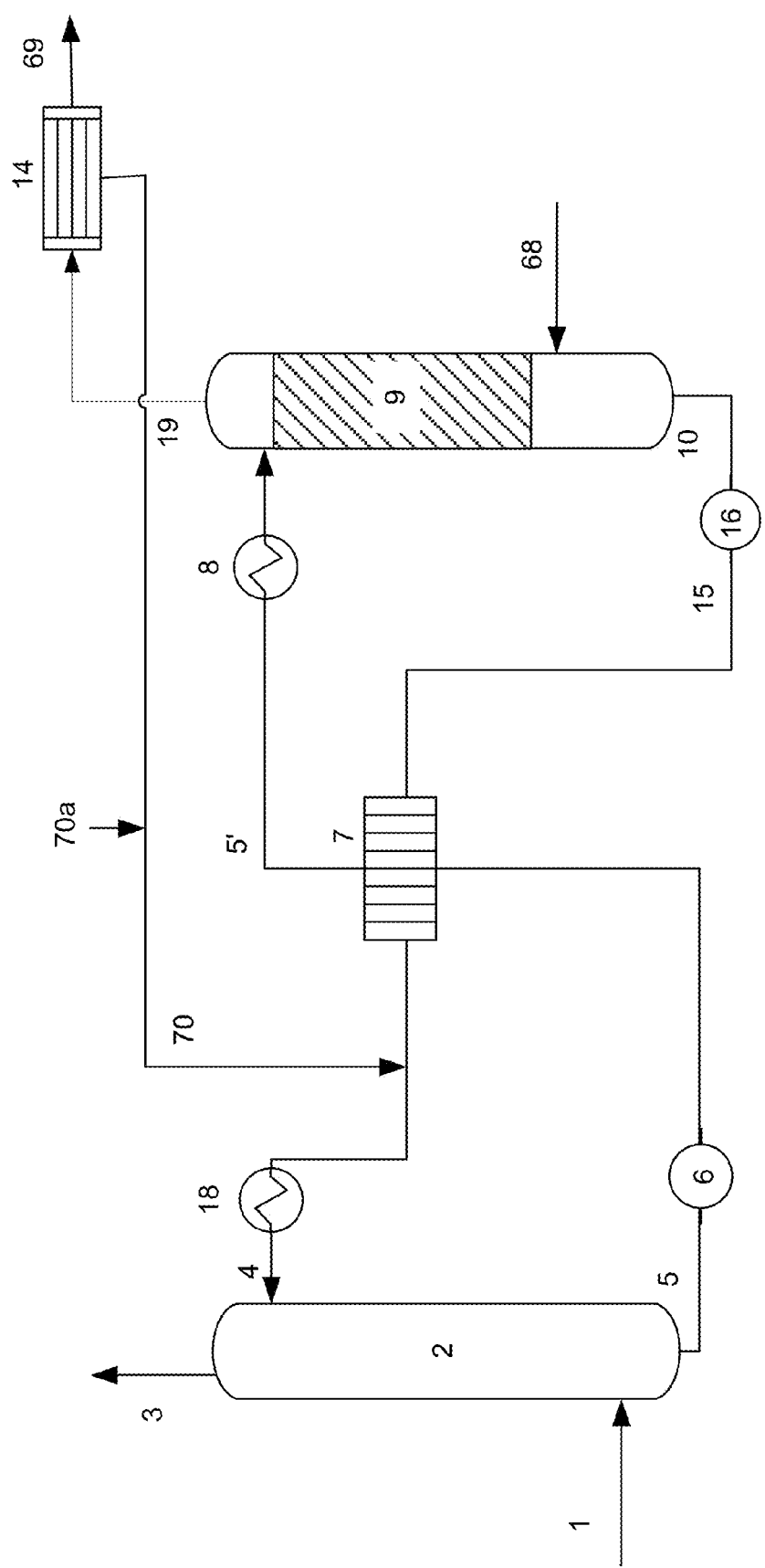
FIG. 6 is a diagram of a biocatalyst-based $CO_2$ capture process where the stripping gas required for the stripping unit is a gas provided from an external source.

In this third option, the reboiler (12) (FIG. 1) is removed from the process. The stripping gas is provided using an external non-condensable gas (under the process conditions). Examples of suitable non-condensable gases are air and nitrogen. The process configuration corresponding to this option is shown in FIG. 6. First, a $CO_2$-containing gas (1) is fed to an absorption unit (2). The gaseous $CO_2$ is absorbed by the absorption solution (4) flowing counter-currently. The treated gas (3), lean in $CO_2$, is discharged from the $CO_2$ capture process to the atmosphere or sent for use or additional treatments. The $CO_2$-rich absorption solution (5) is pumped (pump 6) and sent to a first heat exchanger (7). The heated $CO_2$-rich solution containing the biocatalyst (5') is heated in heat exchanger (8) and then fed to the stripping column (9). Heat exchanger (8) is optional. The solution flows downward, contacts the stripping gas, exits the stripping column (10) and is pumped (pump 16) towards heat exchanger (7) and then heat exchanger (18) and then stream (4) is fed to the absorption column (2). The stripping gas (68) is injected at the bottom of the packing of the stripping column. The gas flows upward, contacts the absorption solution, because of the concentration gradient present between the gas phase and the liquid phase, $CO_2$ is desorbed from the solution and water is vaporised. The gas (19) leaving the stripping column (9) is composed of $CO_2$, water and stripping gas. Stream (19) is then fed to a condenser (14) where water vapor is condensed and sent back to the process (70). The gas (69), containing $CO_2$ and stripping gas, is discharged to the atmosphere, sent for storage or used in different processes.

Figure 6A:
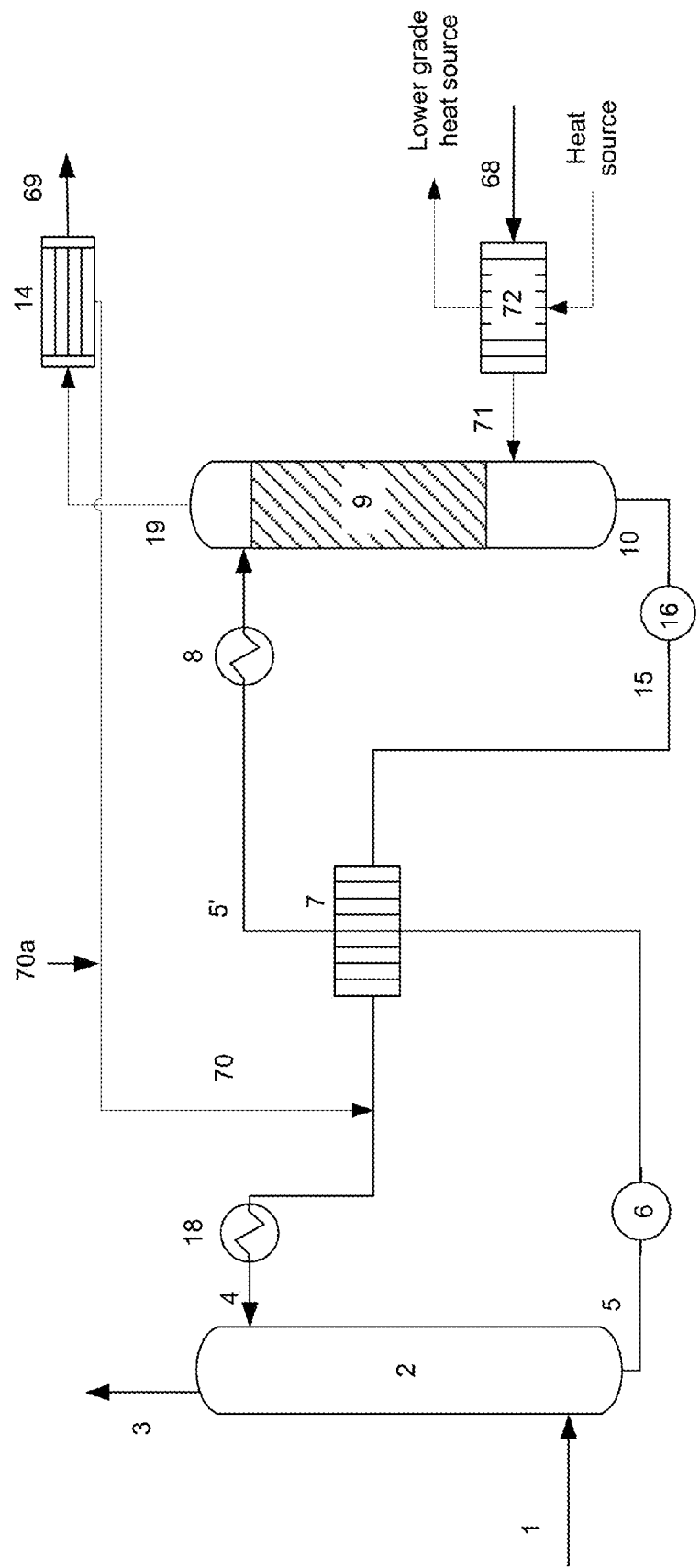
FIG. 6a is a diagram of a biocatalyst-based $CO_2$ capture process where the stripping gas required for the stripping unit is a gas provided from an external source and where the gas is heated prior to being fed to the stripping unit.

Referring to FIG. 6a, in another embodiment, the stripping gas (68) might have its temperature increased, in order to increase the concentration gradient between the liquid and gas phases in the stripping column and favor $CO_2$ desorption (FIG. 6a). In this case, the stripping gas (68) is fed to a heat exchanger (72) for heating thereof and then stream (71) is fed to the stripper (9). In a second embodiment, the stripping unit might be operated under vacuum conditions. Steam (70a) provides the process water make-up. In an additional embodiment, the stripping gas might be fed at different locations along the stripping unit as illustrated in FIG. 3a.

Option 4: Falling-Film Evaporator as a Stripper (Gas-Liquid Contactor)

Figure 7:
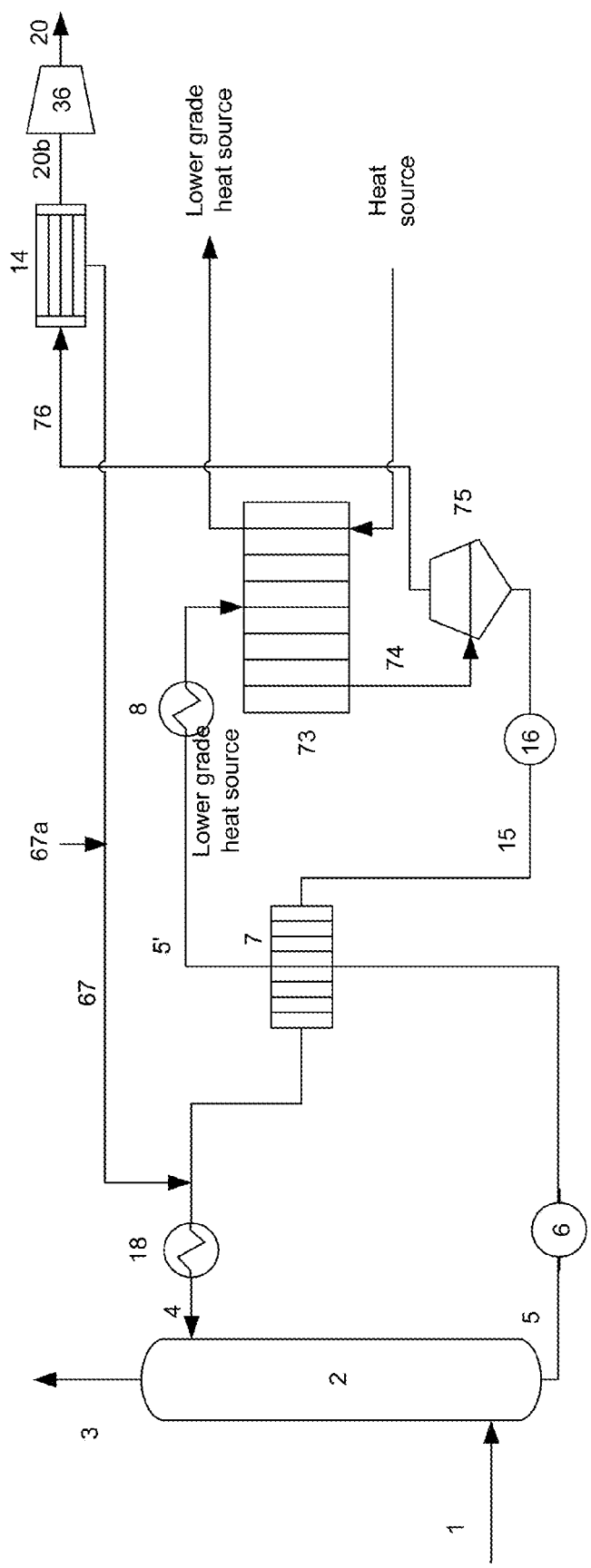
FIG. 7 is a diagram of a biocatalyst-based $CO_2$ capture process where the stripping unit is a falling-film evaporator and where the stripping gas is steam evaporated from the absorption solution.
Figure 7A:
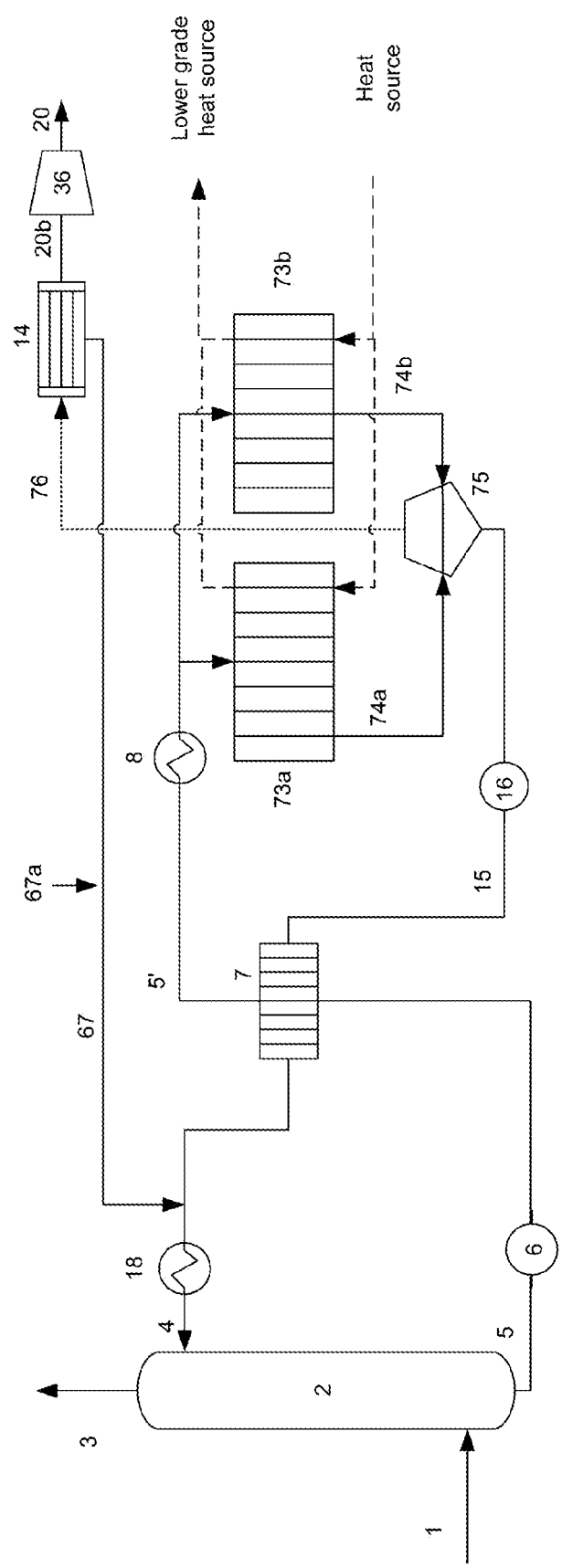
FIG. 7a is a diagram of a biocatalyst-based $CO_2$ capture process where the stripping unit consists in two falling-film evaporators, operated in parallel, and where the stripping gas is steam evaporated from the absorption solution.

The gas-liquid contactor in the stripping unit may also be a falling-film evaporator having a plate or tubular configuration. The stripping unit may also consist in a few falling-film evaporators in series or in parallel. In this case the packed column, tray column or rotating packed bed would be removed. Corresponding process configurations are shown in FIG. 7, 7a (for evaporators in parallel) and 7b (for evaporators in series). A description of these embodiments is provided below.

A first process configuration is provided in FIG. 7 and is described as follows: First, a $CO_2$-containing gas (1) is fed to an absorption unit (2). The gaseous $CO_2$ is absorbed by the absorption solution (4) flowing counter-currently. The treated gas (3), lean in $CO_2$, is discharged from the $CO_2$ capture process to the atmosphere or sent for use or additional treatments. The $CO_2$-rich absorption solution (5) is pumped (6) and flow through a first heat exchanger (7) and the heated stream (5') is fed to a second heat exchanger (8)

to increase its temperature prior its entrance in the stripping unit which is a falling film evaporator (73). Heat exchanger (8) is optional. The heat source provides the energy required to evaporate part of the water present in the aqueous absorption solution. As the steam is produced (water vapor), it acts as the stripping gas and creates a driving force causing $CO_2$ to desorb from the absorption solution. The liquid/vapor mixture (74) is sent to a reservoir (75) where the gas phase and liquid phase are separated. The liquid phase, i.e. the $CO_2$-lean absorption solution (15) is pumped (pump 16) toward heat exchanger (7) and then to a cooler (18). The gas phase leaving reservoir (75), stream (76) is then sent to a condenser where water vapor is condensed and then sent back to the process (67). The high $CO_2$ concentration gas (20b) leaving the condenser is compressed (36) as stream (20) which is sent to other treatments, processes or storage units. Stream (67a) provides water make-up to the process.

The process configuration where the stripping unit consists in two falling-film evaporators operated in parallel is provided in FIG. 7a. The process is as follows: A $CO_2$-containing gas (1) is fed to an absorption unit (2). The gaseous $CO_2$ is absorbed by the absorption solution (4) flowing counter-currently. The treated gas (3), lean in $CO_2$, is discharged from the $CO_2$ capture process to the atmosphere or sent for use or additional treatments. The $CO_2$-rich absorption solution (5) is pumped (6) and flow through a first heat exchangers (7) and then the heated solution (5') is fed to a second heat exchanger (8) to increase its temperature prior its entrance in the stripping unit which consists in two falling-film evaporators configured in parallel (73a & 73b). Heat exchanger (8) is optional. The heat source provides the energy required to evaporate part of the water present in the aqueous absorption solution. As the steam is produced (water vapor), it acts as the stripping gas and creates a driving force causing $CO_2$ to desorb from the absorption solution. The liquid/vapor mixtures exiting units (73a) and (73b), streams (74a & 74b), are sent to a reservoir (75) where the gas phase and liquid phase are separated. In an alternate configuration, streams (74a) and (74b) might be fed to two separate reservoirs. The liquid phase, i.e. the $CO_2$-lean absorption solution (15) is pumped (pump 16) toward heat exchanger (7) and then to a cooler (18). The gas phase leaving reservoir (75), stream (76) is then sent to a condenser where water vapor is condensed and then sent back to the process (67). The high $CO_2$ concentration gas (20b) leaving the condenser (14) is compressed (36) and then stream (20) is sent to other treatments, processes or storage units. Stream (67a) provides water make-up to the process.

Figure 7B:
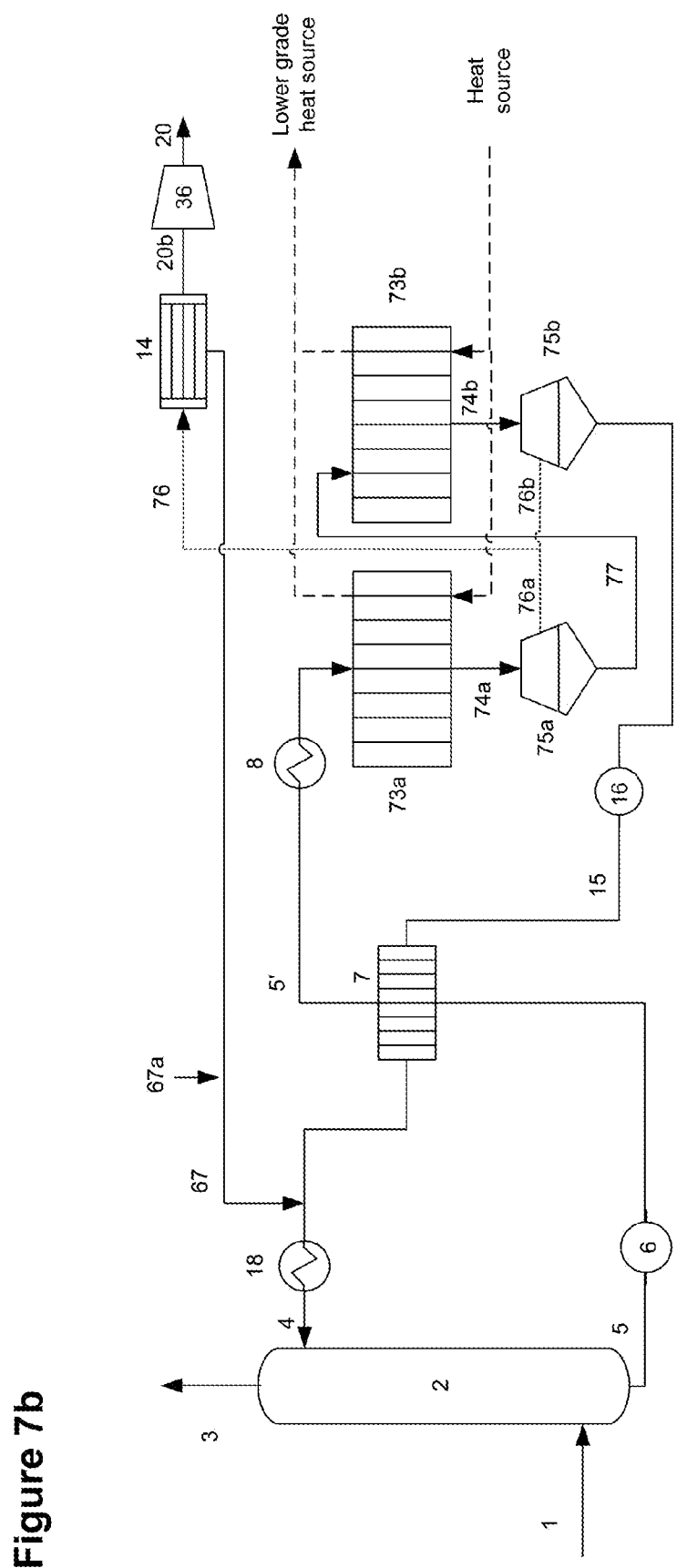
FIG. 7b is a diagram of a biocatalyst-based $CO_2$ capture process where the stripping unit consists in two falling-film evaporators, operated in series, and where the stripping gas is steam evaporated from the absorption solution.

The process configuration where the stripping unit consists in two falling-film evaporators operated in series is provided in FIG. 7b. The process is as follows: A $CO_2$-containing gas (1) is fed to an absorption unit (2). The gaseous $CO_2$ is absorbed by the absorption solution (4) flowing counter-currently. The treated gas (3), lean in $CO_2$, is discharged from the $CO_2$ capture process to the atmosphere or sent for use or additional treatments. The $CO_2$-rich absorption solution (5) is pumped (6) and flow through a first heat exchanger (7) and then stream (5') is sent to a second heat exchanger (8) to increase its temperature prior its entrance in a first falling film evaporator (73a). The heat source provides the energy required to evaporate part of the water present in the aqueous absorption solution. As the steam is produced (water vapor), it acts as the stripping gas and creates a driving force causing $CO_2$ to desorb from the absorption solution. The liquid/vapor mixture leaving (73a) is sent to reservoir (75a) where the gas phase and liquid phase are separated. The liquid phase (77) is fed to the second falling-film evaporator, the heat source provides the energy required to evaporate part of the water present in the aqueous absorption solution. As the steam is produced (water vapor), it acts as the stripping gas and creates a driving force causing $CO_2$ to desorb from the absorption solution. The liquid/vapor mixture leaving (73b) is sent to reservoir (75b) where the gas phase and liquid phase are separated i.e. the $CO_2$-lean absorption solution (15) is pumped using pump (16) toward heat exchanger (7) and then to a cooler (18). The gas streams leaving the reservoirs, streams (76a & 76b) are then combined (stream 76) and sent to a condenser (14) where water vapor is condensed and then sent back to the process (67). The high $CO_2$ concentration gas (20b) leaving the condenser is compressed (36) and then the gas stream (20) is sent to other treatments, processes or storage units. Stream (67a) provides water make-up to the process.

Figure 7C:
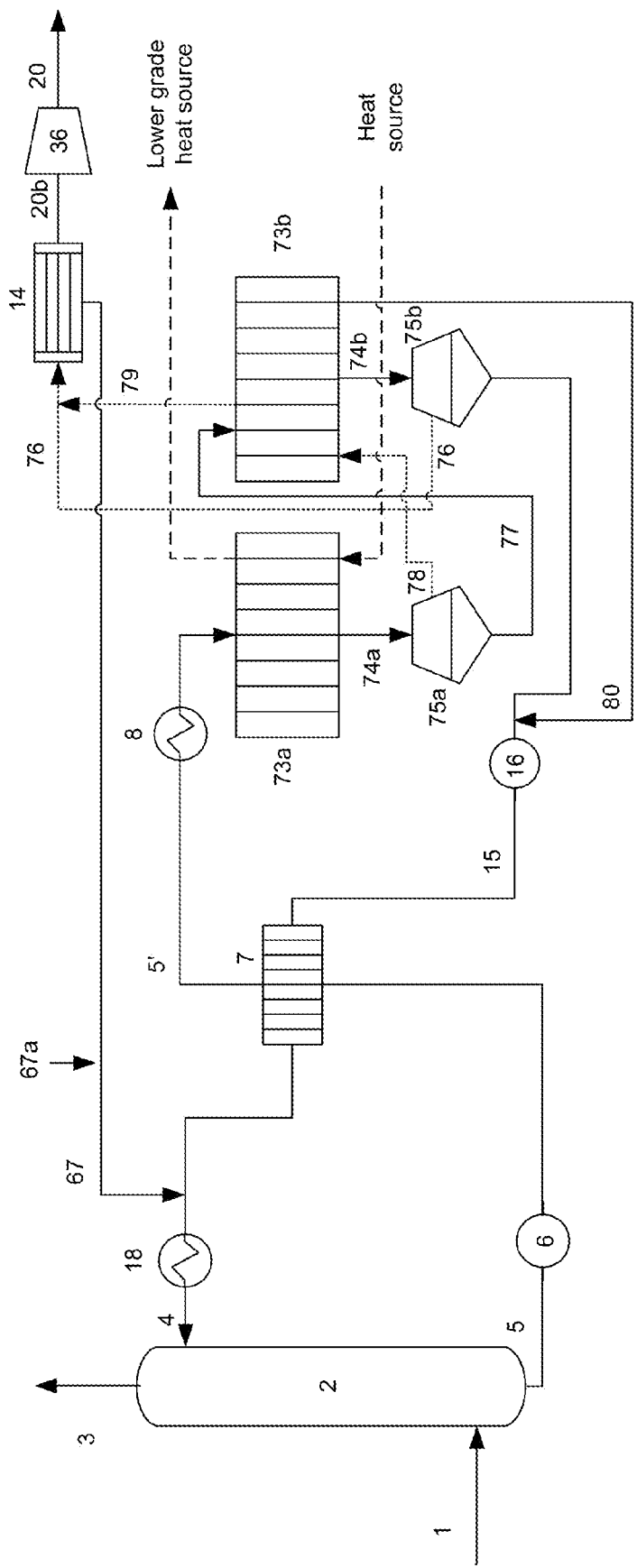
FIG. 7c is a diagram of a biocatalyst-based $CO_2$ capture process where the stripping unit consists in two falling-film evaporators, operated in series, and where the stripping gas of the first falling-film evaporator is the heat source for the second falling-film evaporator.

An alternate configuration to that shown in FIG. 7b is found in FIG. 7c. The difference between both configurations is found around the two falling-film evaporators (73a) and (73b). The process is as follows: A $CO_2$-containing gas (1) is fed to an absorption unit (2). The gaseous $CO_2$ is absorbed by the absorption solution (4) flowing counter-currently. The treated gas (3), lean in $CO_2$, is discharged from the $CO_2$ capture process to the atmosphere or sent for use or additional treatments. The $CO_2$-rich absorption solution (5) is pumped (6) and flow through a first heat exchanger (7) and then stream (5') is sent to a second heat exchanger (8) to increase its temperature prior its entrance in a first falling film evaporator (73a). The heat source provides the energy required to evaporate part of the water present in the aqueous absorption solution. As the steam is produced (water vapor), it acts as the stripping gas and creates a driving force causing $CO_2$ to desorb from the absorption solution. The liquid/vapor mixture (74a) leaving the evaporator (73a) is sent to reservoir (75a) where the gas phase and liquid phase are separated. The liquid phase (77) is fed to the second falling-film evaporator, the gas phase (78) is fed to the second falling-film evaporator, operated at a lower pressure than the first evaporator, where it is used as the heat source to provide the energy required to evaporate part of the water present in the aqueous absorption solution. As its heat is transferred to stream (77) in the falling-film evaporator, vapor is condensed, recovered and sent back to the process (stream 80). The residual vapor and the $CO_2$ (stream 79) is combined with stream (76). As the steam is produced (water vapor), it acts as the stripping gas and creates a driving force causing $CO_2$ to desorb from the absorption solution. The liquid/vapor mixture leaving evaporator (73b), stream (74b) is sent to reservoir (75b) where the gas phase and liquid phase are separated i.e. the $CO_2$-lean absorption solution (15) is pumped toward heat exchanger (7) and then to a cooler (18). The gas stream (76) leaving reservoir 75b is then sent to a condenser (14) where water vapor is condensed and then sent back to the process (67). The high concentration $CO_2$ gas (20b) leaving the condenser is compressed (36) and stream (20) is then sent to other treatments, processes or storage units. Stream (67a) provides water make-up to the process.

It should be understood that any one of the above-mentioned optional aspects of each processes, methods, systems and units may be combined with any other of the aspects thereof, unless two aspects clearly cannot be combined due to their mutually exclusivity.

EXPERIMENTAL RESULTS

The next examples aim at demonstrating the impact of boiling the absorption solution containing the carbonic anhydrase enzyme on the enzyme half-life in the process and how a process configuration change such as using air as the stripping gas impacts the enzyme half-life in the process. These examples describe experimental laboratory tests. The software Protreat® from Optimized Gas Treating Inc was used where process simulations were needed.

Example 1: Determination of 1T1 Carbonic Anhydrase Half-Life in a Lab Scale $CO_2$ Capture Unit Comprising a Reboiler to Produce Steam from the $CO_2$ Lean Absorption Solution Containing Enzyme 1T1 (Reference Process)

Tests were performed to determine the carbonic anhydrase half-life in a laboratory scale capture unit. The process configuration is as shown in FIG. 1. The absorption solution is a 1.45 M $K_2CO_M$ solution with a $CO_2$ loading of 0.7 mol C/mol $K_+$. The carbonic anhydrase enzyme 1T1 was used at a concentration of 0.5 g/L. The $CO_2$ concentration at the inlet of the absorber is 12% (v/v) dry basis and the gas temperature is 30° C. The liquid flow rate is 0.34 liter per minute. The absorber operates at an L/G of 15 g/g. The temperature of the solution is 30° C. in the absorber. The rich absorption solution is heated to 60° C. prior to its entrance in the stripper. The stripper is operated at an absolute pressure of 30 kPa. The lean absorption solution exiting the stripper is at 65° C. and is split in two streams: a first stream being sent toward the absorber at a flow rate of 0.34 L/min. The second stream is fed to the reboiler at a flow rate of 0.76 liter per minute. The reboiler is plate heat-exchanger. A hot water stream at a temperature of 80° C. and at a flow rate of 5 liters per minute provides the energy required to heat and boil the $CO_2$ lean absorption solution and produce steam. The test is run for several days. Over the course of the test, samples are withdrawn to perform enzyme activity determination at different times. The enzyme half-life is then determined.

For the present process conditions, the steam generation rate was 4.5 kg/h and the half-life of enzyme 1T1 was evaluated as 12 hours.

Example 2: Impact of Operation Conditions at the Reboiler on the Steam Generation Rate and the Half-Life of Enzyme 1T1 Under Same Process Configuration as Example 1

To determine the impact of the steam generation rate on the half-life of enzyme 1T1, additional tests were conducted. The tests conditions were changed around the reboiler, other conditions were the same as described in Example 1. They are found in Table 1. For each condition, the steam generation flow rate is provided as the corresponding half-life of enzyme 1T1.

As it can be observed in Table 1, the enzyme half-life is affected by the steam generation flow rate. The highest is the steam generation flow rate, the lowest is 1T1 half-life.

Example 3: 1T1 Half-Life in a Lab Scale $CO_2$ Capture Unit where the Stripping Gas is Air The unit is operated in a process configuration as shown in FIG. 6a where a heating loop is present to heat the lean absorption solution present in the reservoir at the bottom of the stripper and maintain the adequate temperature conditions Tests were performed to determine the carbonic anhydrase half-life in a laboratory scale capture unit where the stripping gas is air. The absorption solution is a 1.45 M $K_2CO_3$ solution with a $CO_2$ loading of 0.7 mol C/mol $K_+$. The carbonic anhydrase enzyme 1T1 is used at a concentration of 0.5 g/L. The schematic diagram of the unit is the same as shown in FIG. 6a where an additional heat exchanger is present to heat the liquid present in the reservoir at the bottom of the stripper. The $CO_2$ concentration at the inlet of the absorber is 13.5% (v/v) and the gas temperature is 30° C. The liquid flow rate is 0.35 liter per minute. The absorber operates at an L/G of 15 g/g. The temperature of the solution is 30° C. in the absorber and the rich absorption solution is heated to 60° C. prior to its entrance in the stripper. The stripper is operated at an absolute pressure of 45 kPa. The solution exiting the stripper is at 65° C. and is then cooled down and fed to the absorber. Air, at a temperature of 60° C., is fed at a flow rate of 30 g/minute at the bottom of the stripping column. The initial $CO_2$ capture performance was 75%. Under same conditions, but without using the enzyme, the $CO_2$ capture performance is 15%. This confirms the impact of the enzyme 1T1 on the $CO_2$ capture performance. The test is run for several days. Over the course of the test, enzyme activity determination is performed at different sampling times. The enzyme half-life is then determined.

Under these process conditions the 1T1 half-life is 13 days (312h). As compared to the base case presented in Example 1, this represents a 2 500% increase. As compared to the other cases presented in Example 2 (Table 1), this represents a 225 to 1 735% increase. This clearly demonstrates that minimizing the enzyme exposition to high gas/liquid interfaces is a key process parameter to increase the enzyme half-life in a $CO_2$ capture process.

TABLE 1

Steam generation rate as a function of reboiler operation conditions

| Solution flow rate to the reboiler (liter/min) | Hot water flow rate (liters/min) | Pressure at the outlet of the reboiler (kPa) | Hot water temperature (° C.) | Steam generation flow rate (kg/h) | 1T1 half-life (h) |
|---|---|---|---|---|---|
| 0.8 | 5 | 30 | 80.0 | 4.5 | 12 |
| 0.8 | 5 | 30 | 75.0 | 1.6 | 62 |
| 2.0 | 3 | 30 | 80.0 | 3.6 | 33 |
| 0.8 | 5 | 30 | 77.5 | 4.1 | 17 |
| 2.0 | 5 | 30 | 77.5 | 3.3 | 32 |
| 2.0 | 5 | 30 | 75.0 | 1.2 | 96 |

Example 4: Simulation of $CO_2$ Stripping Unit Comprising a Stripping Gas Loop where the Stripping Liquid is Water and where the Generated Steam is Injected at Different Heights of the Stripping Packed Column—Impact of the Number of Injection Points (FIG. 3a)

A 1.45 M $K_2CO_3$ rich absorption solution comprising enzyme 1T1 at a concentration of 0.5 g/L is fed at flowrate of $6.46\times10^4$ kg/h to a $CO_2$ stripping unit consisting in a packed column. The packed column is 25 m height×1.11 m diameter. The stripping unit is operated at a temperature of 66° C. and a pressure of 30 kPa. The stripping gas is steam which is provided via a stripping gas loop. The temperature of the rich absorption solution fed to the stripping unit is 65° C. and the pressure is 150 kPa. Steam is provided at a pressure of 30 kPa and a temperature of 71° C.

Simulations were run, for a same $CO_2$ desorption efficiency (47%), to determine the impact of the number of steam injection points on two parameters: steam condensation rate into the absorption solution, total steam flow rate required. Results of the simulations are reported in Table 2. Positions of the injection ports are specified as height in (m). A position of 0 m corresponds to the top of the stripping unit.

TABLE 2

| Nb injection points/position | Steam condensation rate (kg/h) | Steam flow rate (kg/h) |
| --- | --- | --- |
| 1/(25 m) | 740 | 2 100 |
| 2/(12.5, 25 m) | 690 | 1 800 |
| 4 (3, 10, 17, 25 m) | 600 | 1 690 |
| 9 (3, 5, 7, 9, 12, 15, 18, 22, 25 m) | 400 | 1 476 |

The simulations results show that under the process conditions, increasing the number of steam injection points enable to reduce the steam condensation rate in the stripping unit. Another benefit is that the steam flow rate required is importantly reduced.

In a process where steam condensate in the absorption solution leaving the stripper, process configurations such as those shown in FIGS. 4, 4a and 4b should be used to evaporate the condensed steam and bring the absorption solution composition back to its specification.

Example 5: Simulation of $CO_2$ Stripping Unit Comprising a Stripping Gas Loop where the Stripping Liquid is Water and where the Generated Steam is Injected at 9 Different Injection Points—Impact of the Temperature of the Rich Absorption Solution Fed to the Stripper Unit Additional simulations were run to determine the feasibility of injecting steam without having the steam condensation issue to manage. One considered strategy is to heat the rich absorption solution, fed at the stripping unit, at a higher temperature. The case considered to illustrate the impact of a higher solution temperature is as described in Example 4 where steam is injected at 9 different injection ports. Simulation results are shown in Table 3.

TABLE 3

| Temperature, rich absorption solution (° C.) | Steam condensation rate (kg/h) | Steam flow rate (kg/h) |
| --- | --- | --- |
| 65 | 400 | 1 476 |
| 68 | 253 | 1 450 |
| 69 | 162 | 1 400 |
| 70 | 67 | 1 350 |
| 71 | −35 | 1 350 |

The simulation results shown in Table 3 clearly show that by increasing the temperature of the rich absorption solution entering the stripping unit, the steam condensation rate is decreased as the required steam flow rate. More specifically, simulation results indicate that process conditions might be adjusted to avoid steam condensation and hence the need of an evaporation loop to manage the solution composition.

Example 6: Steam Injection Via a Stripping Gas Loop at the Bottom of the Stripping Unit and Addition of Two Heating Loops (Process Configuration FIG. 3b)

Simulations were run to determine the impact of adding two heating loops to a stripping unit where steam is injected at the bottom of the packing. Process conditions are as described in Example 4. Regarding the two heating loops, where 15% of the absorption solution is pumped to, they comprise one pump and one heat exchanger. A first loop withdraw the absorption solution at 5 m and returns it back at 5.5 m. The temperature of the solution is increased from 60 to 70° C. The second heating loop withdraw the liquid at 10 m and returns it at 10.5 m. The temperature of the solution is heated from 63 to 70° C.

The simulation results indicate that under these process conditions, the steam condensation rate is decreased from 740 to 294 kg/h while the steam flow rate required is decreased from 2 100 to 1850. However additional heat duty of 0.85 GJ/h would be required. Additional simulations by adjusting the fraction of solvent flow going through the 2 loops to 25 and then 35%, show that steam condensation rate can be decreased down to 86 kg/h and steam flow rate down to 1700 kg/h while extra heat duty of 1.24 GJ/h would be required.

Example 7: Simulation Air Stripping

A flue gas containing 15% $CO_2$ (v/v) is to be treated to capture 90% of its $CO_2$. The flue gas has a temperature of 30° C. and a pressure of 111 kPa and is fed at a flow rate of 3 250 kg/h to a 15 tonnes per day $CO_2$ capture unit. The absorption solution fed at the absorption unit is 1.45 M $K_2CO_3$ at a $CO_2$ loading of 0.7 mol C/mol K. The absorption unit is operated at an L/G of 10 kg/kg. The design of the stripper unit where air is used as the stripping gas is performed using the Protreat® software (process configuration shown in FIG. 6a). In the case the stripper unit is operated at 30 kPa and 70° C., an air flowrate of 75 kg/h enables a sufficient solvent regeneration to obtain a 90% performance for the capture unit. For the case the stripper unit is operated at 101 kPa and a temperature of 70° C., an air flow rate of 700 kg/h is required. For both cases, the stripper would have a diameter of 1.15 m and a height of 10 m, same dimensions as for the case the $CO_2$ capture would be operated using a reboiler and where stripping conditions would be a pressure of 30 kPa and a temperature of 70° C.

These results show that air stripping is technically feasible and is an interesting alternative to using a reboiler to generate the stripping gas. Moreover, the fact that the enzyme is not exposed to the reboiler in this process configuration will result in an increased enzyme half-life and thus in reduced operation costs.

What is claimed is:

1. A method for stripping $CO_2$ from a biocatalyst-containing $CO_2$-rich absorption solution to produce a biocatalyst-containing $CO_2$-lean absorption solution and a $CO_2$-rich gas, the method comprising:
   generating a stripping gas from a portion of the biocatalyst-containing $CO_2$-lean absorption solution in a stripping gas generation unit, and
   contacting the biocatalyst-containing $CO_2$-rich absorption solution with the stripping gas in a gas-liquid contactor to produce the $CO_2$-lean absorption solution and the $CO_2$-rich gas;
   wherein the biocatalyst is a carbonic anhydrase in a soluble form, freely dissolved in the absorption solution such that the carbonic anhydrase in a soluble form flows in solution within the stripping gas generation unit and is maintained in soluble form throughout the flow of the absorption solution in the stripping gas generation unit, and wherein the stripping gas generation unit is a falling film evaporator.

2. The method of claim 1, wherein the gas-liquid contactor is a gas-liquid direct contactor.

3. The method of claim 2, wherein the gas-liquid contactor is a packed column, a tray column, a spray reactor or a rotating packed bed.

4. A method for stripping $CO_2$ from a biocatalyst-containing $CO_2$-rich absorption solution to produce a biocatalyst-containing $CO_2$-lean absorption solution and a $CO_2$-rich gas, the method comprising:
   generating a stripping gas from the biocatalyst-containing $CO_2$-rich absorption solution, and
   contacting the biocatalyst-containing $CO_2$-rich absorption solution with the stripping gas in a gas-liquid contactor to produce the $CO_2$-lean absorption solution and the $CO_2$-rich gas;
   wherein the biocatalyst is a carbonic anhydrase in a soluble form, freely dissolved in the absorption solution such that the carbonic anhydrase in a soluble form flows in solution within the stripping gas generation unit and is maintained in soluble form throughout the flow of the absorption solution in the stripping gas generation unit, and wherein the stripping gas generation unit is a falling film evaporator.

5. The method of claim 4, wherein generating the stripping gas comprises heating the biocatalyst-containing $CO_2$-rich absorption solution in the gas-liquid contactor, thereby simultaneously generating the stripping gas and stripping $CO_2$ from the biocatalyst-containing $CO_2$-rich absorption solution in the gas-liquid contactor.

6. The method of claim 4, wherein the gas-liquid contactor is a gas-liquid direct contactor, optionally a falling film evaporator.

7. The method of claim 1, wherein the biocatalyst-containing $CO_2$-rich absorption solution is an aqueous solution, and the generated stripping gas includes steam.

8. The method of claim 1, wherein the stripping gas is fed to a plurality of spaced-apart locations distributed along a height of the gas-liquid contactor.

9. The method of claim 1, wherein the biocatalyst-containing $CO_2$-rich absorption solution is withdrawn from different sections of the gas-liquid contactor to be heated and reinjected in the gas-liquid contactor via heating loops.

10. The method of claim 1, comprising minimizing or avoiding exposure of the biocatalyst-containing $CO_2$-rich absorption solution and the biocatalyst-containing $CO_2$-lean absorption solution to bubble-formation conditions at which new gas-liquid interfaces are created via bubble formation.

11. A biocatalyst-based $CO_2$ capture process comprising:
    contacting a $CO_2$-containing gas with a biocatalyst-containing absorption solution to produce a biocatalyst-containing $CO_2$-rich absorption solution, and
    using a $CO_2$ stripping method as defined in claim 1 to desorb $CO_2$ from the biocatalyst-containing $CO_2$-rich absorption solution, thereby producing the $CO_2$-lean absorption solution and the $CO_2$-rich gas;
    wherein the biocatalyst is a carbonic anhydrase in a soluble form, freely dissolved in the absorption solution such that the carbonic anhydrase in a soluble form flows in solution within the stripping gas generation unit and is maintained in soluble form throughout the flow of the absorption solution in the stripping gas generation unit, and wherein the stripping gas generation unit is a falling film evaporator.

12. The method of claim 4, wherein the biocatalyst-containing $CO_2$-rich absorption solution is an aqueous solution, and the generated stripping gas includes steam.

13. The method of claim 4, wherein the stripping gas is fed to a plurality of spaced-apart locations, preferably distributed along a height of the gas-liquid contactor.

14. The method of claim 4, wherein the biocatalyst-containing $CO_2$-rich absorption solution is withdrawn from different sections of the gas-liquid contactor to be heated and reinjected in the gas-liquid contactor via heating loops.

15. The method of claim 5, comprising minimizing or avoiding exposure of the biocatalyst-containing $CO_2$-rich absorption solution and the biocatalyst-containing $CO_2$-lean absorption solution to bubble-formation conditions at which new gas-liquid interfaces are created via bubble formation.

* * * * *